(12) United States Patent
Marshall

(10) Patent No.: US 12,012,971 B2
(45) Date of Patent: Jun. 18, 2024

(54) FLUID PUMPS

(71) Applicant: Collins Engine Nozzles, Inc., West Des Moines, IA (US)

(72) Inventor: Travis H. Marshall, West Hartford, CT (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 12 days.

(21) Appl. No.: 17/359,443

(22) Filed: Jun. 25, 2021

(65) Prior Publication Data

US 2022/0412371 A1  Dec. 29, 2022

(51) Int. Cl.
  *F04D 29/42* (2006.01)
  *F04D 1/04* (2006.01)
  *F04D 17/06* (2006.01)

(52) U.S. Cl.
  CPC ........... *F04D 29/4206* (2013.01); *F04D 1/04* (2013.01); *F04D 17/06* (2013.01); *F04D 29/4293* (2013.01); *F05D 2230/31* (2013.01); *F05D 2240/10* (2013.01)

(58) Field of Classification Search
  CPC ........ F04D 1/04; F04D 29/406; F04D 29/426; F04D 29/4293; F04D 29/026; F04D 7/00; F04B 53/16–168; F04B 53/10–129; B33Y 80/00
  See application file for complete search history.

(56) References Cited

U.S. PATENT DOCUMENTS

| | | | |
|---|---|---|---|
| 6,584,762 B2 | 7/2003 | Snow et al. | |
| 10,247,296 B2 | 4/2019 | van der Merwe et al. | |
| 10,443,630 B2* | 10/2019 | Collins | B22F 5/10 |
| 10,557,464 B2 | 2/2020 | Scancarello et al. | |
| 11,009,017 B2* | 5/2021 | Babbini | F04B 39/08 |
| 11,021,963 B2* | 6/2021 | Binek | F23R 3/283 |
| 2018/0029123 A1 | 2/2018 | Gubelmann et al. | |
| 2018/0163898 A1* | 6/2018 | Von Arb | B33Y 10/00 |
| 2018/0291933 A1 | 10/2018 | Weickel et al. | |
| 2019/0084218 A1 | 3/2019 | Rauch et al. | |
| 2020/0347728 A1 | 11/2020 | Binek et al. | |

FOREIGN PATENT DOCUMENTS

| | | |
|---|---|---|
| EP | 3734160 A1 | 11/2020 |
| GB | 2510498 A | 8/2014 |
| WO | 2017105182 A1 | 6/2017 |
| WO | 2017105204 A1 | 6/2017 |
| WO | 2018177753 A1 | 10/2018 |

OTHER PUBLICATIONS

Extended European Search Report dated Feb. 13, 2023 for Application No. 22195716.0.

* cited by examiner

*Primary Examiner* — Brian P Wolcott
(74) *Attorney, Agent, or Firm* — Bachman & LaPointe, P.C.

(57) ABSTRACT

In accordance with at least one aspect of this disclosure, embodiments of fluid pumps, pump cases, valve bodies, and volutes are disclosed herein. Embodiments of methods for manufacturing fluid pumps, pump cases, valve bodies, and volutes are also disclosed herein. Embodiments can include additive manufacturing, for example. Certain embodiments can include additively manufacturing a pump case in a tilted orientation, utilizing only coincidental support structure having a unique shape, and with teardrop shaped volute and/or valve body.

18 Claims, 26 Drawing Sheets

FLUID PUMPS

FIELD

This disclosure relates to fluid pumps (e.g., augmenter fuel pumps for aircraft).

BACKGROUND

Existing fuel pumps for aircraft are molded and machined. Traditional fuel pump designs and methods make it difficult, if not impossible, to additively manufacture certain fuel pumps to be useful and economical over traditional manufacturing methods, for example.

Conventional methods and designs have generally been considered satisfactory for their intended purpose. However, there is still a need in the art for improved fluid pump designs and methods of manufacturing. The present disclosure provides a solution for this need.

SUMMARY

In accordance with at least one aspect of this disclosure, a method for manufacturing a fluid pump can include additively manufacturing a fluid pump case in a tilted orientation without any non-build plate support structure in any internal apertures of the fluid pump case except for coincidental support structure only in one or more coincidental locations that are already intended to be subjected to post process milling unrelated to the coincidental support structure. In certain embodiments, the method can include milling the one or more coincidental locations to a final shape and/or finish, and in the process, eliminating the coincidental support structure.

The one or more coincidental locations can be one or more valve bodies of the fluid pump case configured to house valve components. The tilted orientation can include a tilt in at least two axes.

A Cartesian build plate coordinate system can be defined relative to a build plate. The Cartesian build plate coordinate system can include a build plate G-axis, a build plate F-axis, and a build plate H-axis. The build plate can have a planar shape define in a build plate G-F plane. A Cartesian part coordinate system can be defined relative to the fluid pump case, the Cartesian part coordinate system can include a part G-axis, a part F-axis, and a part H-axis.

In certain embodiments, the tilted orientation can be such that the part H-axis is tilted relative to the build plate H-axis by about 40 degrees to about 45 degrees in the build plate F-H plane, and the part G-axis is tilted from the build plate G-axis by about 50 degrees to about 55 degrees in the build plate G-F plane.

The tilted orientation can be such that the part H-axis is tilted relative to the build plate H-axis by about 43.6 degrees in the build plate F-H plane, and the part G-axis is tilted from the build plate G-axis by about 52.4 degrees in the build plate G-F plane. The fluid pump case can include a plurality of openings defining a plurality of parallel axes that are parallel with the part H-axis.

The fluid pump case can include at least one opening defining a non-parallel axis that is not parallel with the part H-axis. In certain embodiments, the at least one non-parallel axis can be orthogonal to the parallel axes. Coincidental support structure can be built within at least one of the plurality of openings.

In accordance with at least one aspect of this disclosure, a non-transitory computer readable medium, comprising computer executable instructions configured to cause a computer to execute a method, the method including operating an additively manufacturing machine to build a fluid pump case layer by layer in a tilted orientation such that no non-build plate support structure is used in any internal apertures of the fluid pump case except for only coincidental support structure in one or more coincidental locations that are already intended to be subjected to post process milling unrelated to the coincidental support structure. The method can otherwise be the same or similar to any method disclosed herein, e.g., as described above. Any suitable other method(s) and/or portion(s) thereof are contemplated herein.

In accordance with at least one aspect of this disclosure, an additive manufacturing system can have a non-transitory computer readable medium as disclosed herein, e.g., as described above. In accordance with at least one aspect of this disclosure, embodiments can include a means for additively manufacturing a fluid pump case.

In accordance with at least one aspect of this disclosure, a fuel pump for an aircraft can include a fluid pump case formed by any suitable method disclosed herein, e.g., as described above. The fluid pump can include one or more fluid pump components (e.g., impeller, one or more valves, etc.) disposed within the fluid pump case.

In accordance with at least one aspect of this disclosure, an additively manufactured valve body for a fluid pump case can include an interior surface, a plurality of interior annular features integrally formed with and extending radially inwardly from the interior surface and positioned apart in an axial direction relative to each other, and a support structure formed integrally with and connecting a lower-in-build annular feature to a higher-in-build annular feature. In certain embodiments, the support structure can include a filled-in Y-shape.

For example, the support structure can include a stem and a wide portion extending from the stem. The stem of the support structure is integrally formed with and extends from a lower-in-build portion of the lower-in-build annular feature. The wide portion can extend from the stem and can be integrally formed with and connected to a higher-in-build portion of the higher-in-build annular feature.

The valve body can include a support structure for each annular feature. Each support structure can extend between each successive pair of annular features. In certain embodiments, the valve body can be constructed at an angle between the axial direction and a build plate surface of greater than about 45 degrees.

In accordance with at least one aspect of this disclosure, an additively manufactured fluid pump case can include a valve body. For example, the valve body can be as disclosed herein, e.g., as described above.

In accordance with at least one aspect of this disclosure, a method can include additively manufacturing a valve body of fluid pump case as disclosed herein, e.g., as described above. The method can also include milling away the support structure while finish-milling the valve body.

In certain embodiments, additively manufacturing can be or include laser power bed fusion. The method can include removing powder from within the valve body before milling through openings defined by the support structure. The method can include inserting a valve into the valve body. The method can include any other suitable method(s) and/or portions thereof. Embodiments can include a means for additively manufacturing a valve body as disclosed herein, e.g., as described above.

In accordance with at least one aspect of this disclosure, an additively manufactured valve body for a fluid pump case can include an interior surface defining a main channel along an axis in an axial direction. The channel can have a non-uniform cross-section configured to allow the valve body to be additively manufactured without support structure.

In certain embodiments, the non-uniform cross-section can have a teardrop shape. For example, the interior surface can include a curved lower-in-build portion and a ramped higher-in-build portion that forms a V-shape extending from the curved lower-in-build portion. The curved lower-in-build portion can have a semicircle cross-section. The ramped higher-in-build portion can include a curved peak. In certain embodiments, the valve body can be additively manufactured such that the axis forms an angle of about 45 degrees or less with a build plate surface on which the valve body is built.

The interior surface can further define one or more annular grooves extending radially outwardly from the main channel. The one or more annular grooves include an asymmetric groove profile.

A higher-in-build portion of the one or more annular grooves can include a curved shape in the axial direction, and a lower-in-build portion of the one or more annular grooves can include a straight shape in the axial direction.

In certain embodiments, the one or more annular grooves can be two annular grooves positioned apart in an axial direction relative to each other. Any suitable number of annular grooves are contemplated herein.

In accordance with at least one aspect of this disclosure, an additively manufactured fluid pump case can include a valve body as disclosed herein, e.g., as described above. In accordance with at least one aspect of this disclosure, a method of manufacturing a fluid pump case can include additively manufacturing a valve body as disclosed herein, e.g., as described above, and machining the main channel to have a different cross-section to allow the valve body to receive one or more valve components while leaving the one or more annular grooves.

In accordance with at least one aspect of this disclosure, embodiments can include fluid pump case means for use as a fluid pump housing, the fluid pump case means having valve body means configured to allow additive manufacturing of the fluid pump case without building support structure in the valve body.

In accordance with at least one aspect of this disclosure, a fluid pump case can include an interior volute surface defining a volute channel. The interior volute surface can include a first portion having a D-shaped cross-section, a second portion having a teardrop shaped cross-section downstream of the first portion, and a transition portion between the first portion and the second portion having a changing cross-section.

The teardrop cross-section can include a curved lower-in-build portion and a ramped higher-in-build portion that forms a V-shape extending from the curved lower-in-build portion. The curved lower-in-build portion can have a semicircle cross-section. The ramped higher-in-build portion can have a curved peak.

The second portion can be shaped such that it is additively manufactured without support structure. For example, a centerline of the peak along the length of the second portion can be coplanar with a vertical build direction in build such that the teardrop shape is symmetric about a vertical plane.

The first portion can have an expanding flow area in a flow direction toward the second portion. The second portion can have an expanding flow area or constant flow area in the flow direction.

The volute channel can further include a reducing portion downstream of the second portion. The reducing portion can include a teardrop shape cross-section. The reducing portion can be connected to a valve channel defined by a valve body.

In accordance with at least one aspect of this disclosure, a method can include additively manufacturing a fluid pump case to include an interior volute surface defining a volute channel as disclosed herein, e.g., as described above. Additively manufacturing can include aligning a centerline of the peak along the length of the second portion to be coplanar with a vertical build direction in build such that the teardrop shape is symmetric about a vertical plane. In accordance with at least one aspect of this disclosure, embodiments can include volute means for a fluid pump case.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
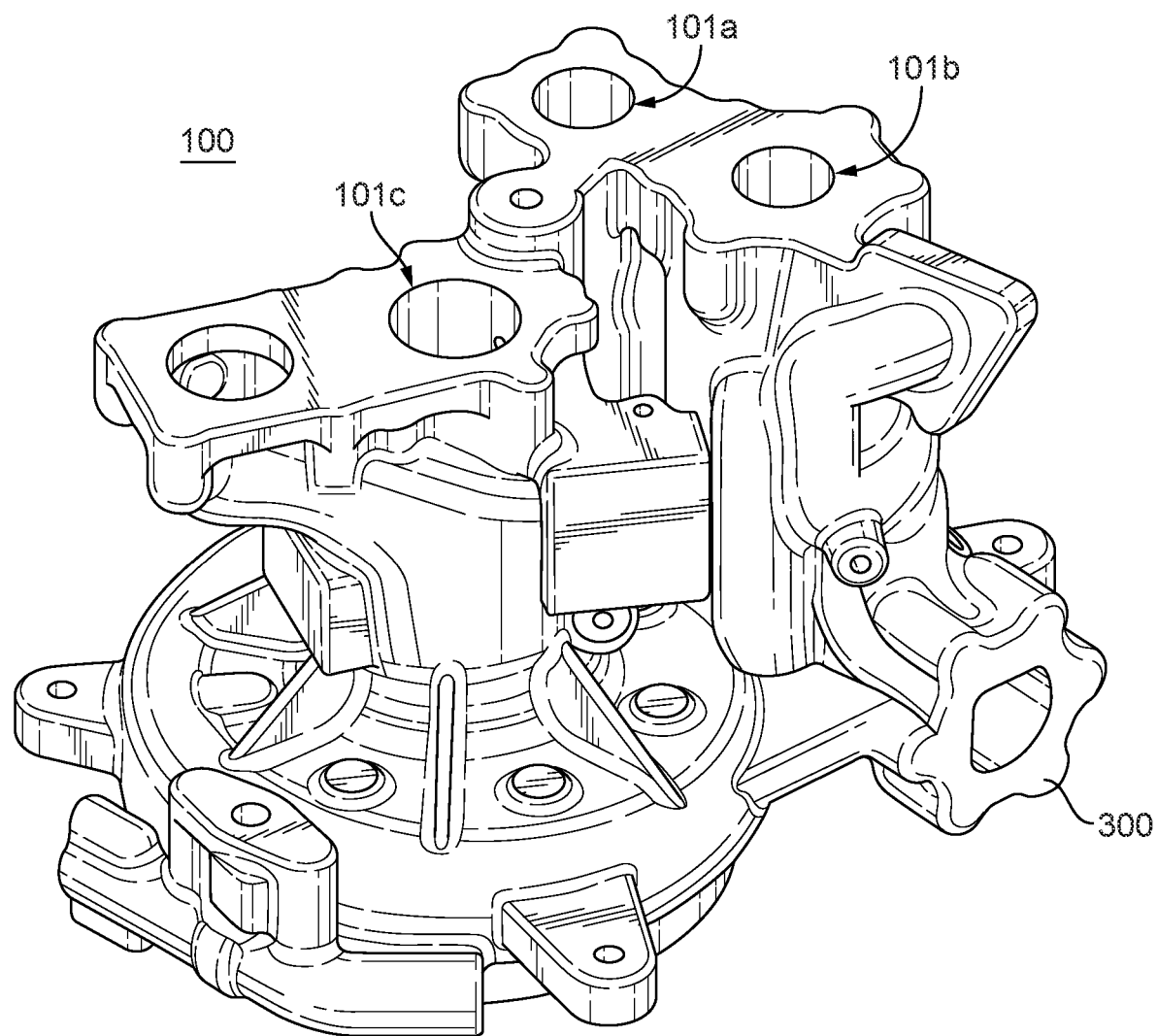
FIG. 1A is a perspective view of an embodiment of a fluid pump case in accordance with this disclosure.

Reference will now be made to the drawings wherein like reference numerals identify similar structural features or aspects of the subject disclosure. For purposes of explanation and illustration, and not limitation, an illustrative view of an embodiment of a fluid pump case in accordance with the disclosure is shown in FIG. 1A and is designated generally by reference character 100. Other embodiments and/or aspects of this disclosure are shown in FIGS. 1B-4F.

Figure 1B:
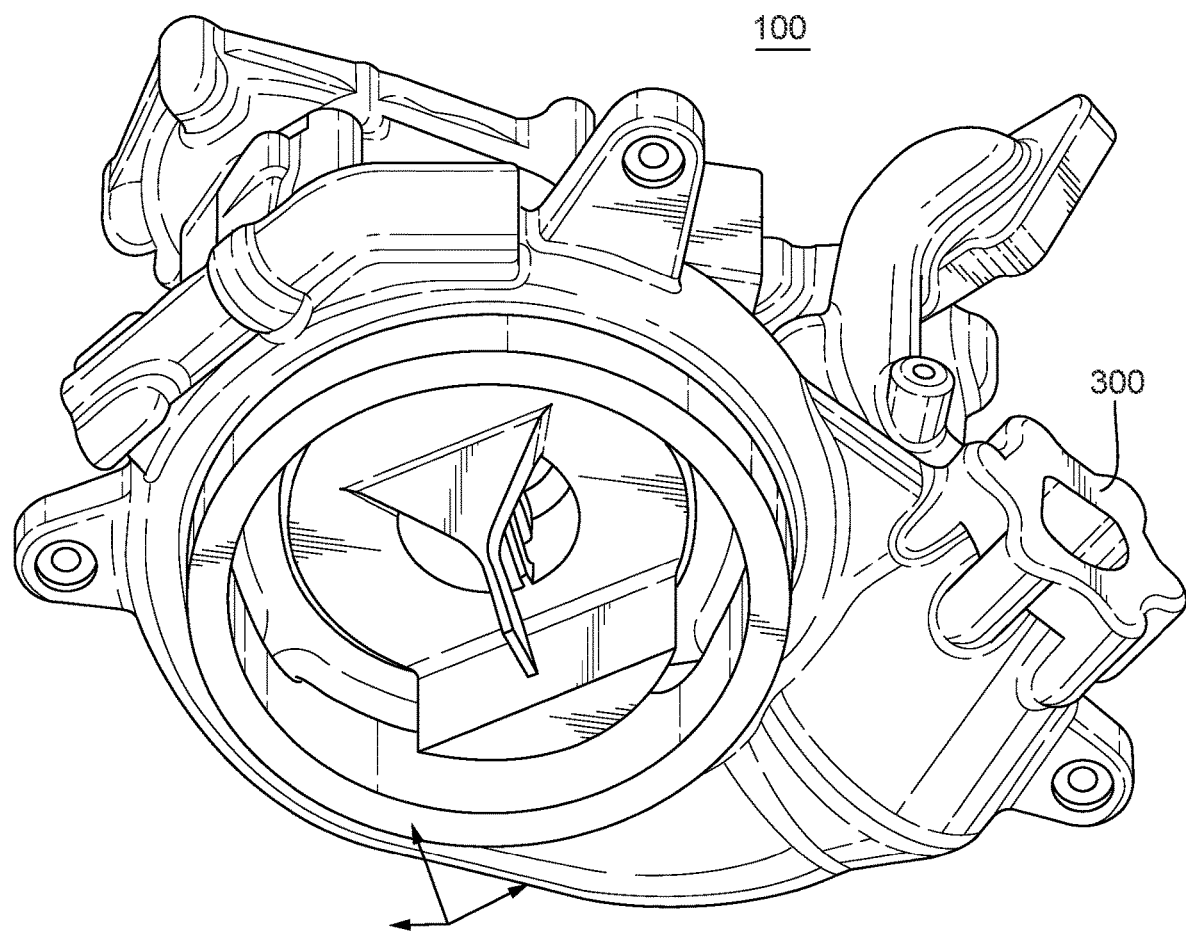
FIG. 1B is an underside perspective view of the embodiment of FIG. 1A.
Figure 1C:
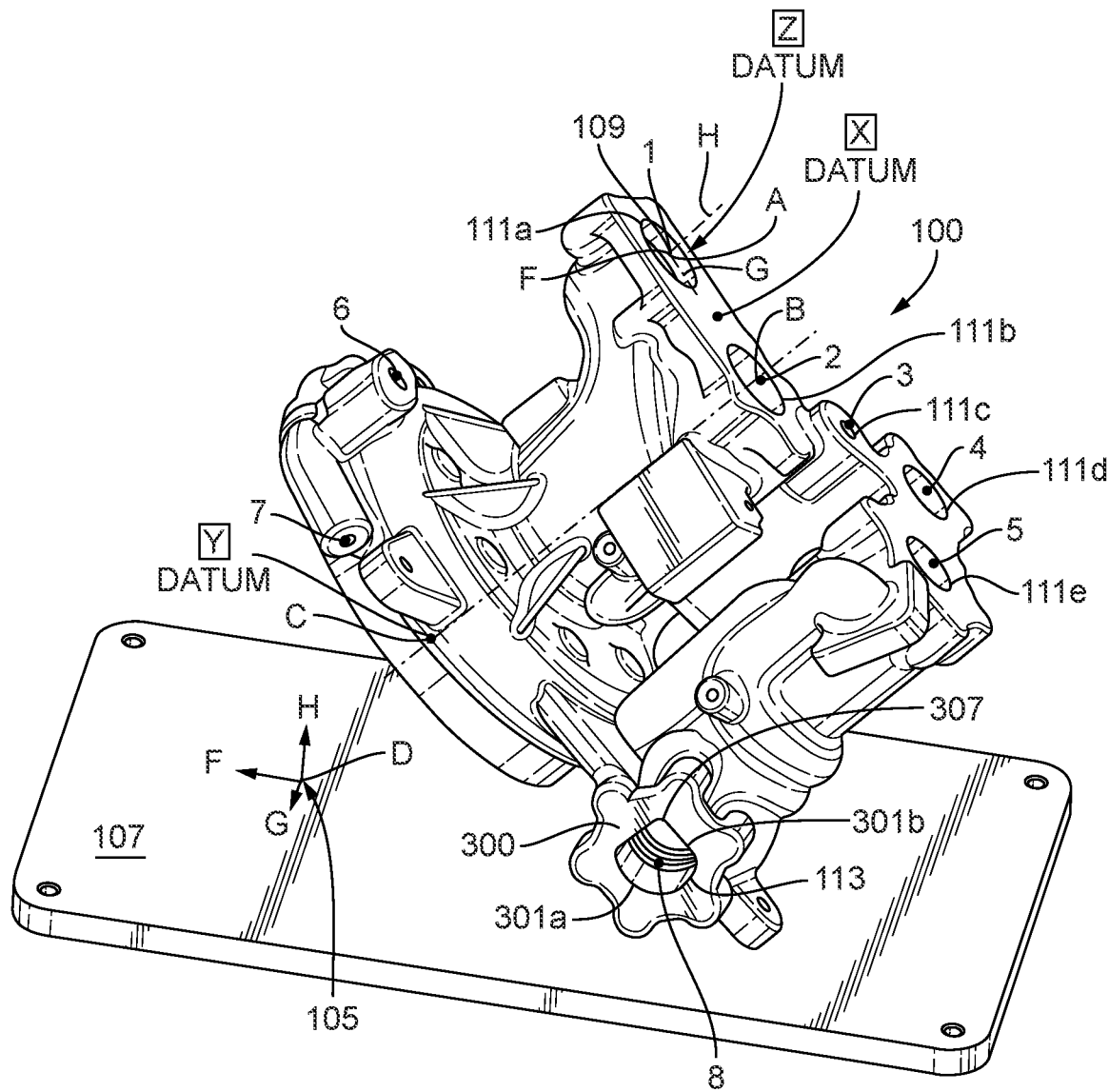
FIG. 1C is a perspective view of the embodiment of FIG. 1A shown relative to a build plate in an embodiment of a tilted build orientation for additive manufacturing, illustrating a location of a build plate coordinate system and a part coordinate system.
Figure 1D:
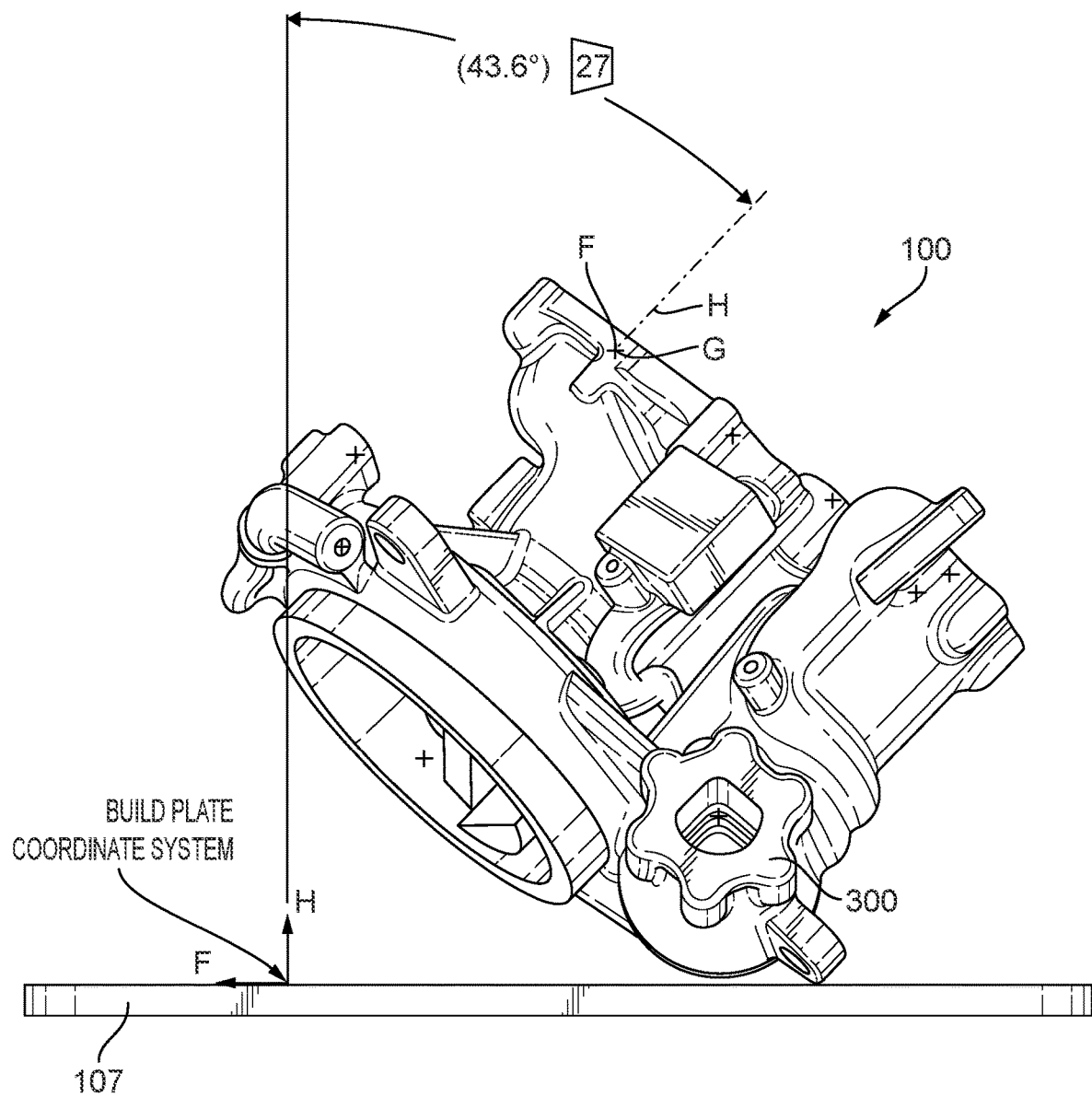
FIG. 1D is a front elevation view of the embodiment of FIG. 1C, showing an embodiment of an angle defined between a first pair of axes of the coordinate systems.
Figure 1E:
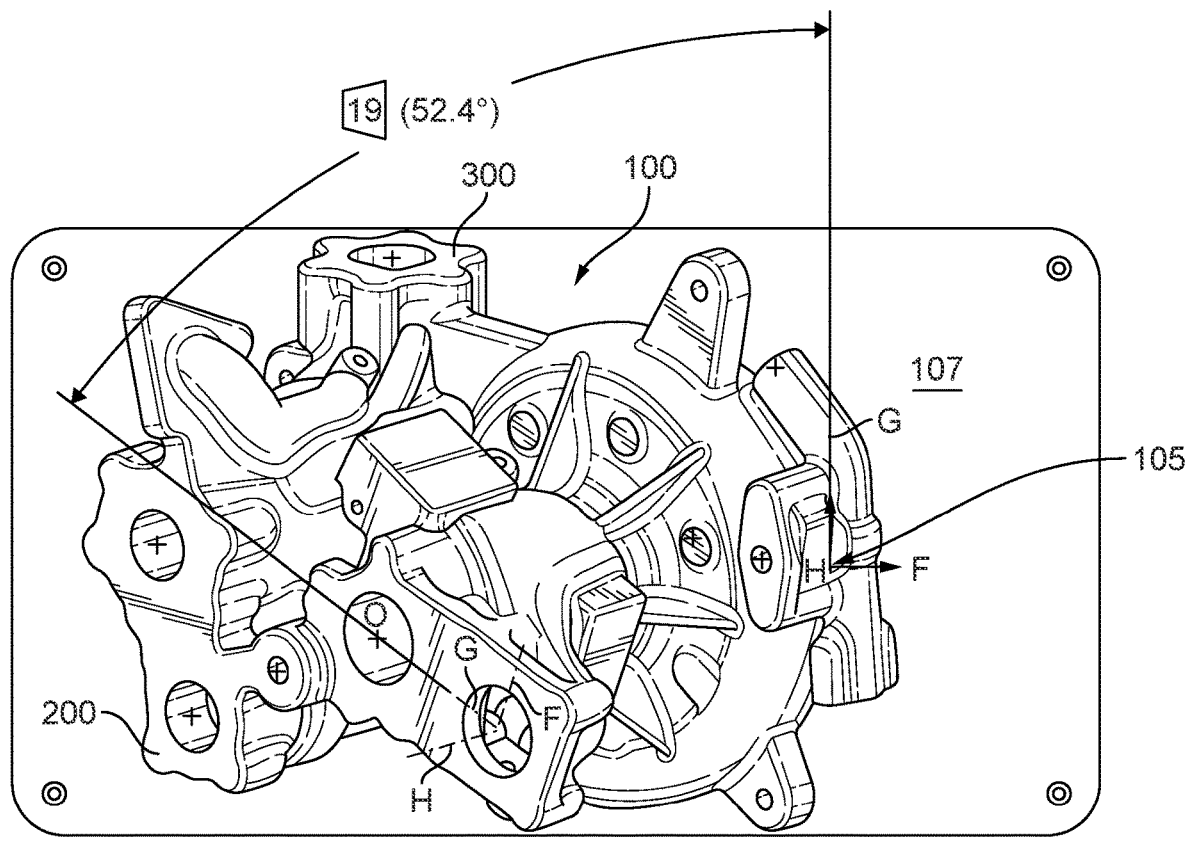
FIG. 1E is a top down plan view of the embodiment of FIG. 1D, showing an embodiment of an angle between another pair of axes of the coordinate systems.
Figure 1F:
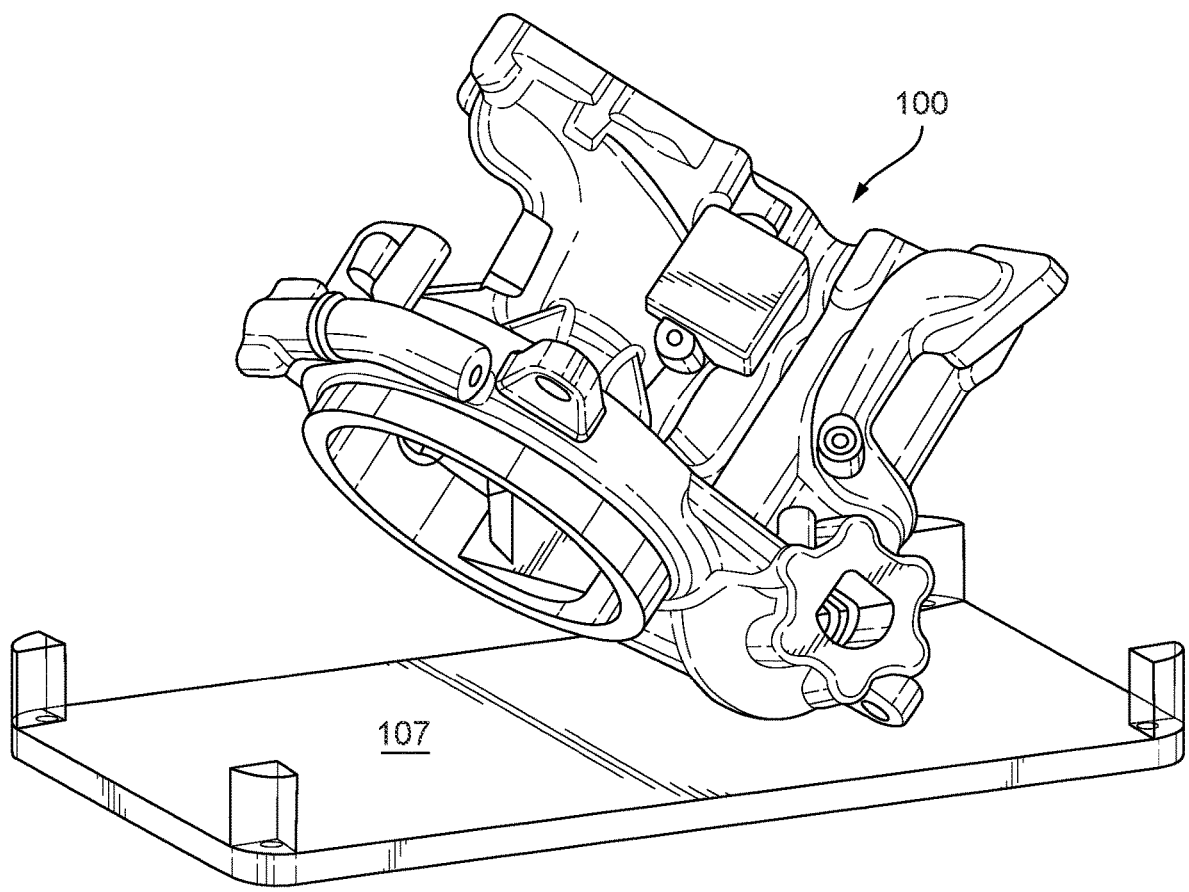
FIG. 1F is another perspective view of the embodiment of FIG. 1C.
Figure 1G:
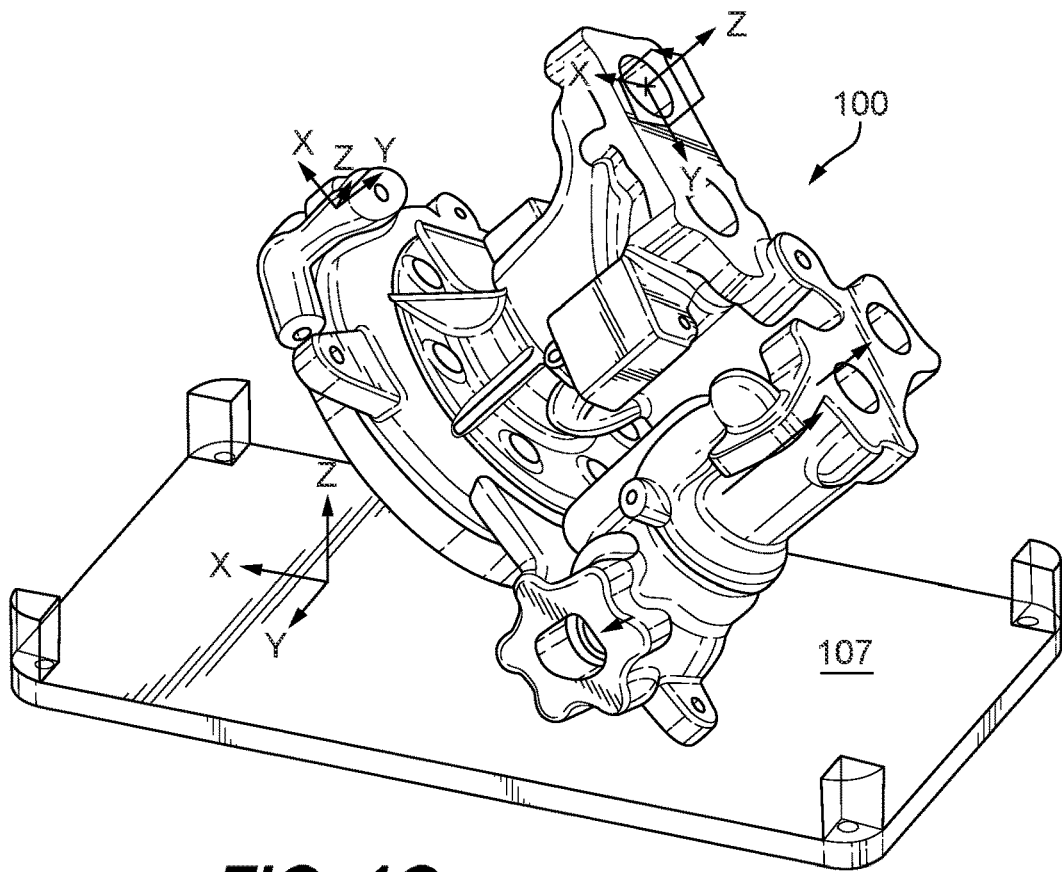
FIG. 1G is another perspective view of the embodiment of FIG. 1C.
Figure 1H:
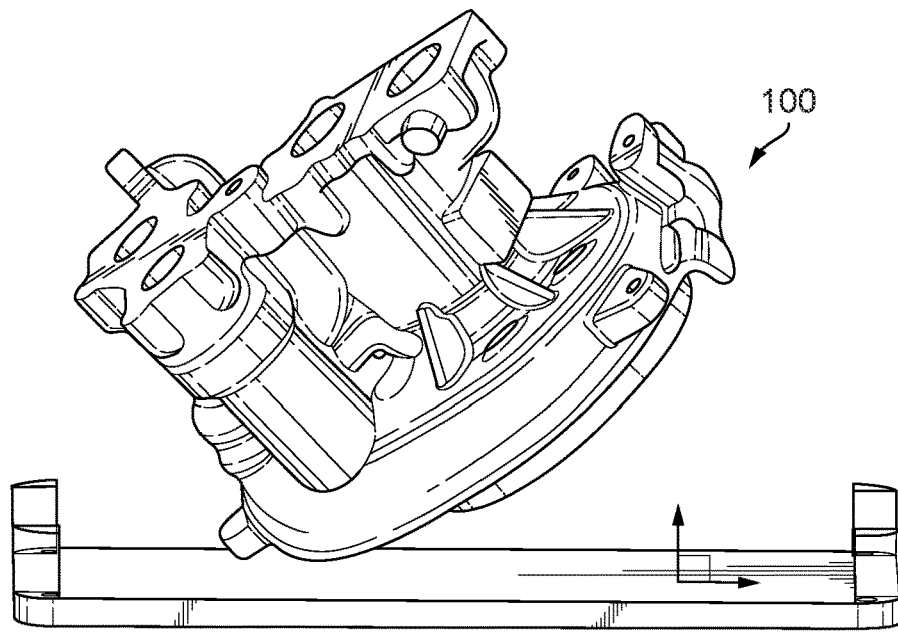
FIG. 1H is another perspective view of the embodiment of FIG. 1C.
Figure 1I:
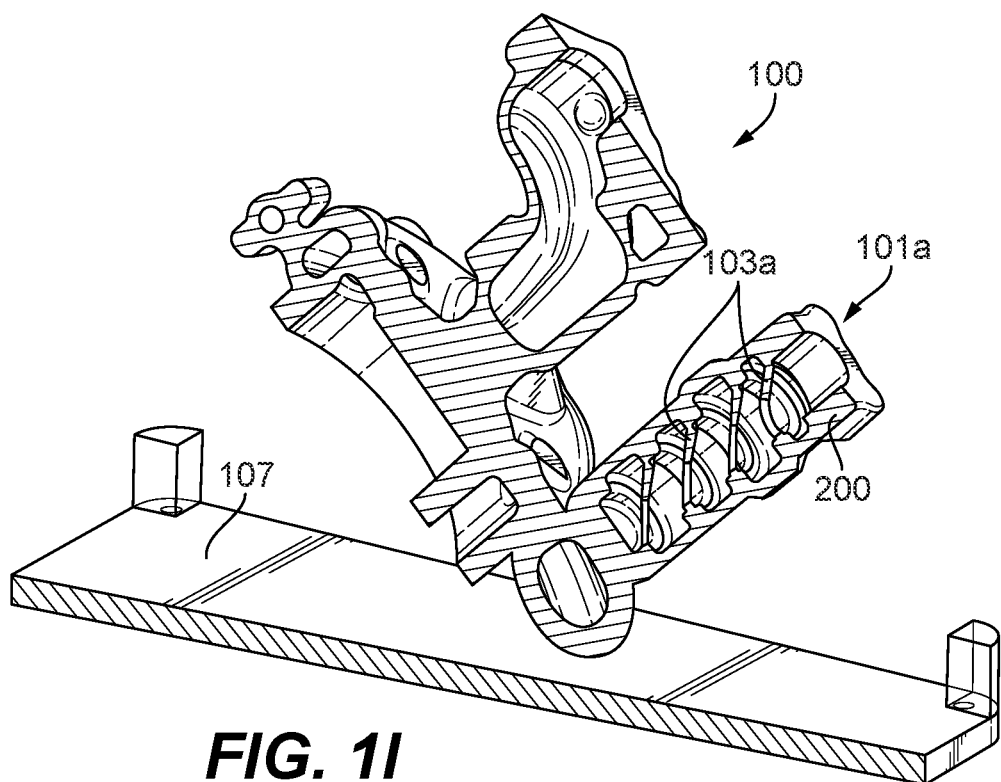
FIG. 1I is a cross-sectional perspective view of the embodiment of FIG. 1C.
Figure 1J:
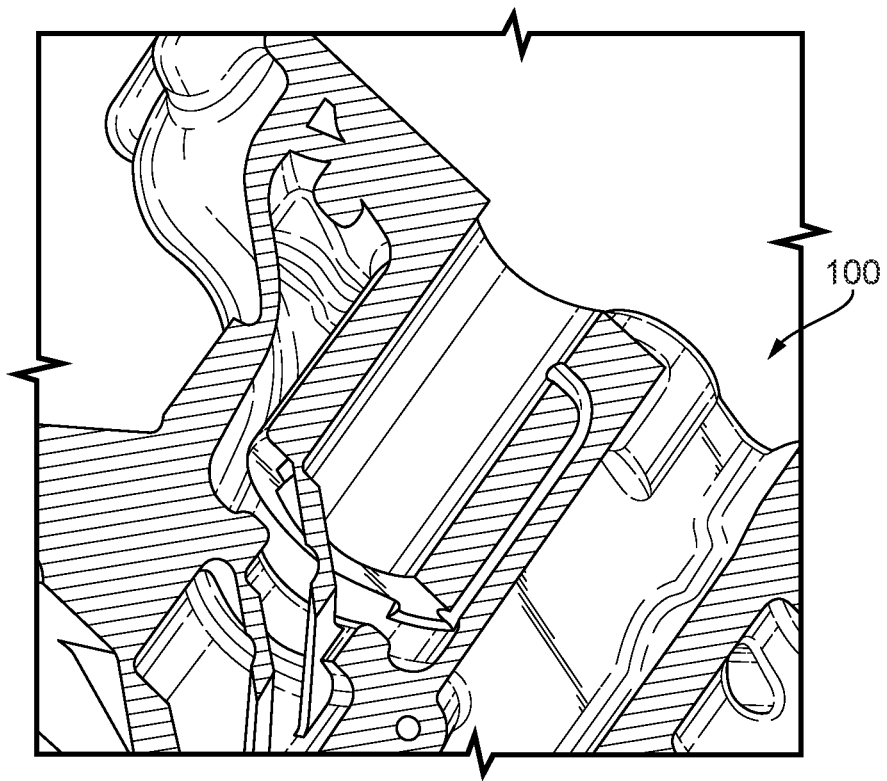
FIG. 1J is a cross-sectional perspective view of a portion of the embodiment of FIG. 1C.
Figure 1K:
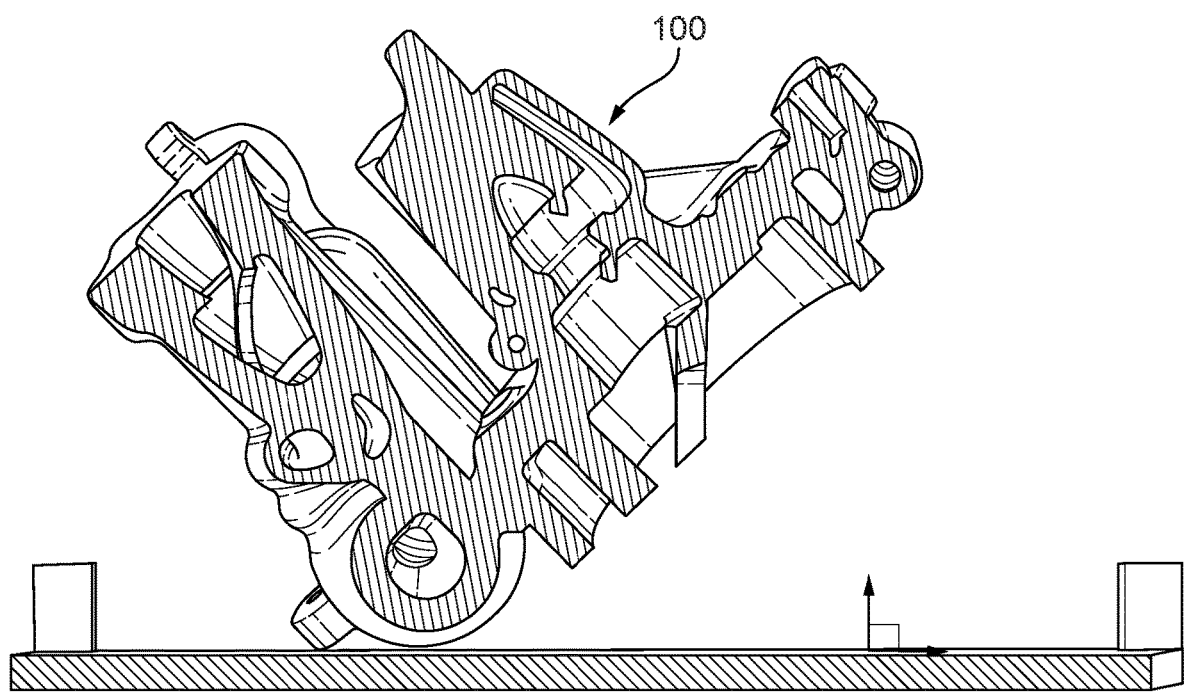
FIG. 1K is a cross-sectional view of the embodiment of FIG. 1C, shown sectioned in a plane approximately parallel to that of FIG. 1I, looking in an opposite direction.
Figure 1L:
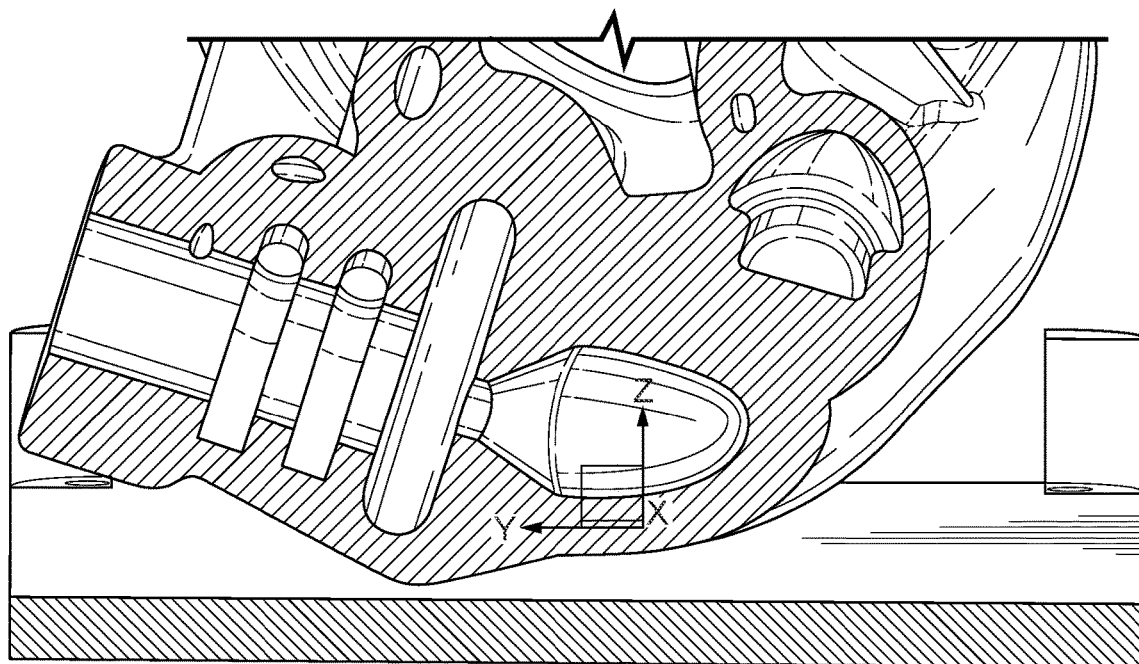
FIG. 1L is a cross-sectional view of a portion of the embodiment of FIG. 1C, sectioned in a plane approximately orthogonal to that of FIG. 1K.
Figure 1M:
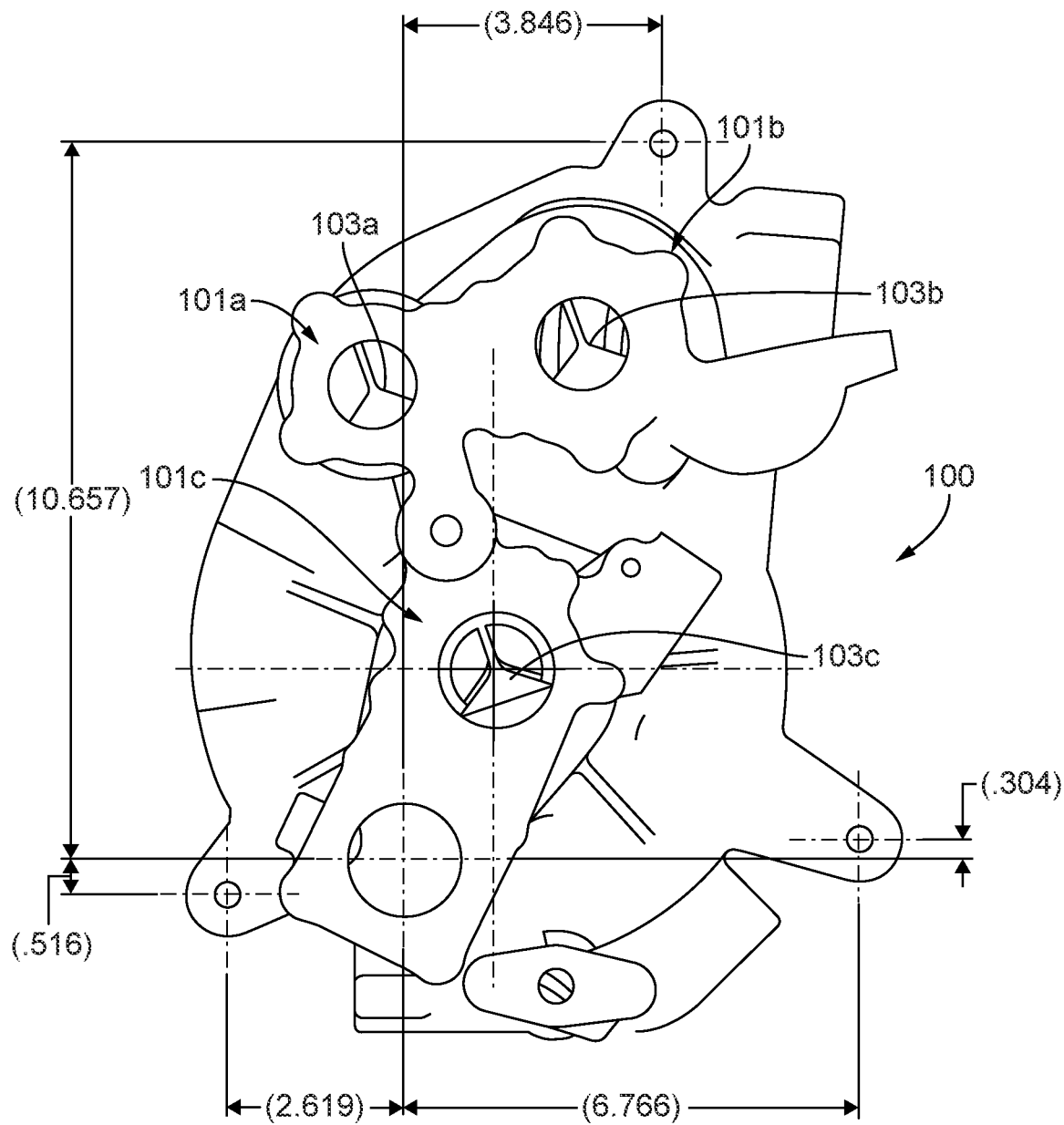
FIG. 1M is a top down plan view of the embodiment of FIG. 1A.
Figure 1N:
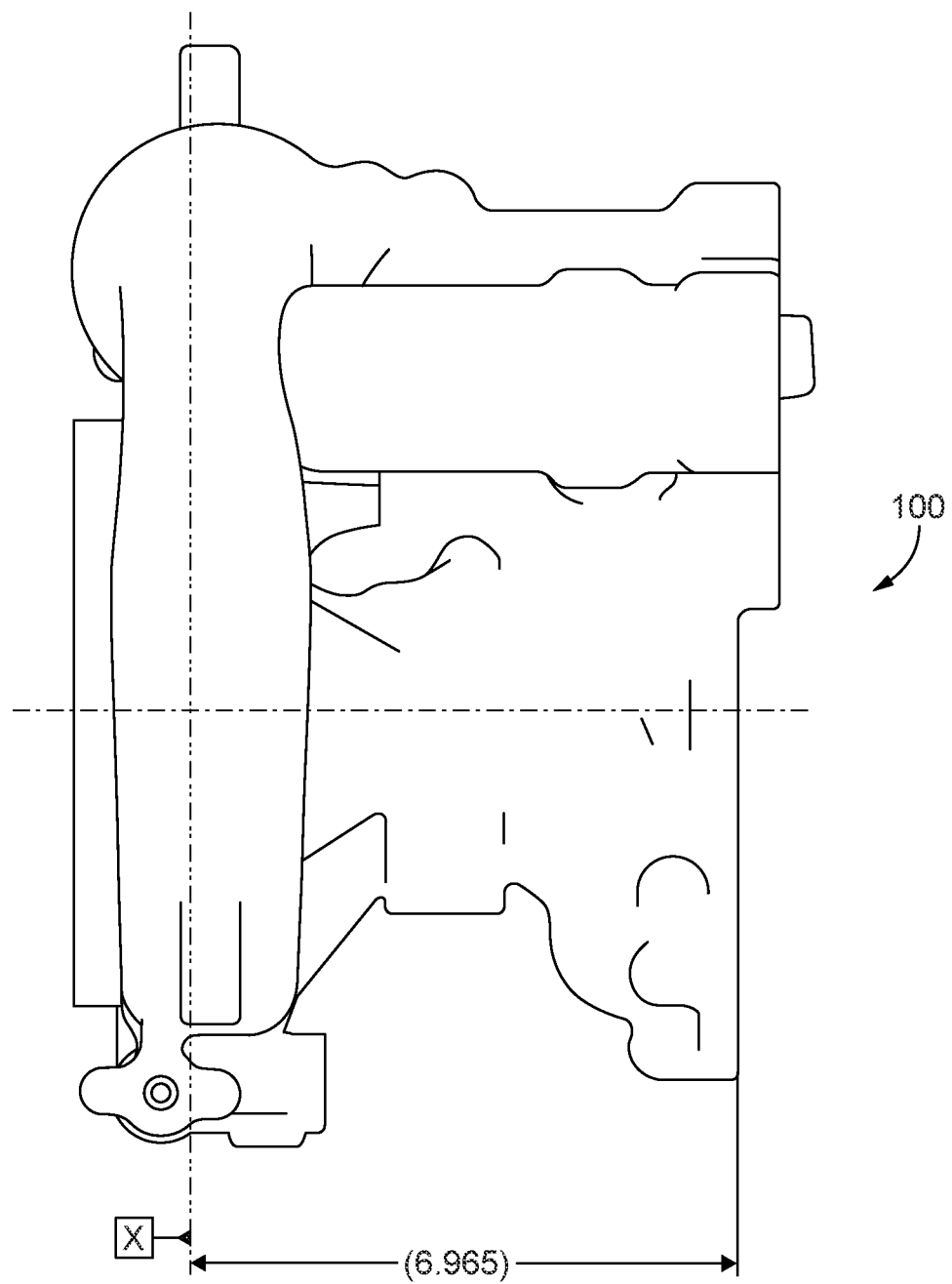
FIG. 1N is an elevation view of the embodiment of FIG. 1A.
Figure 1O:
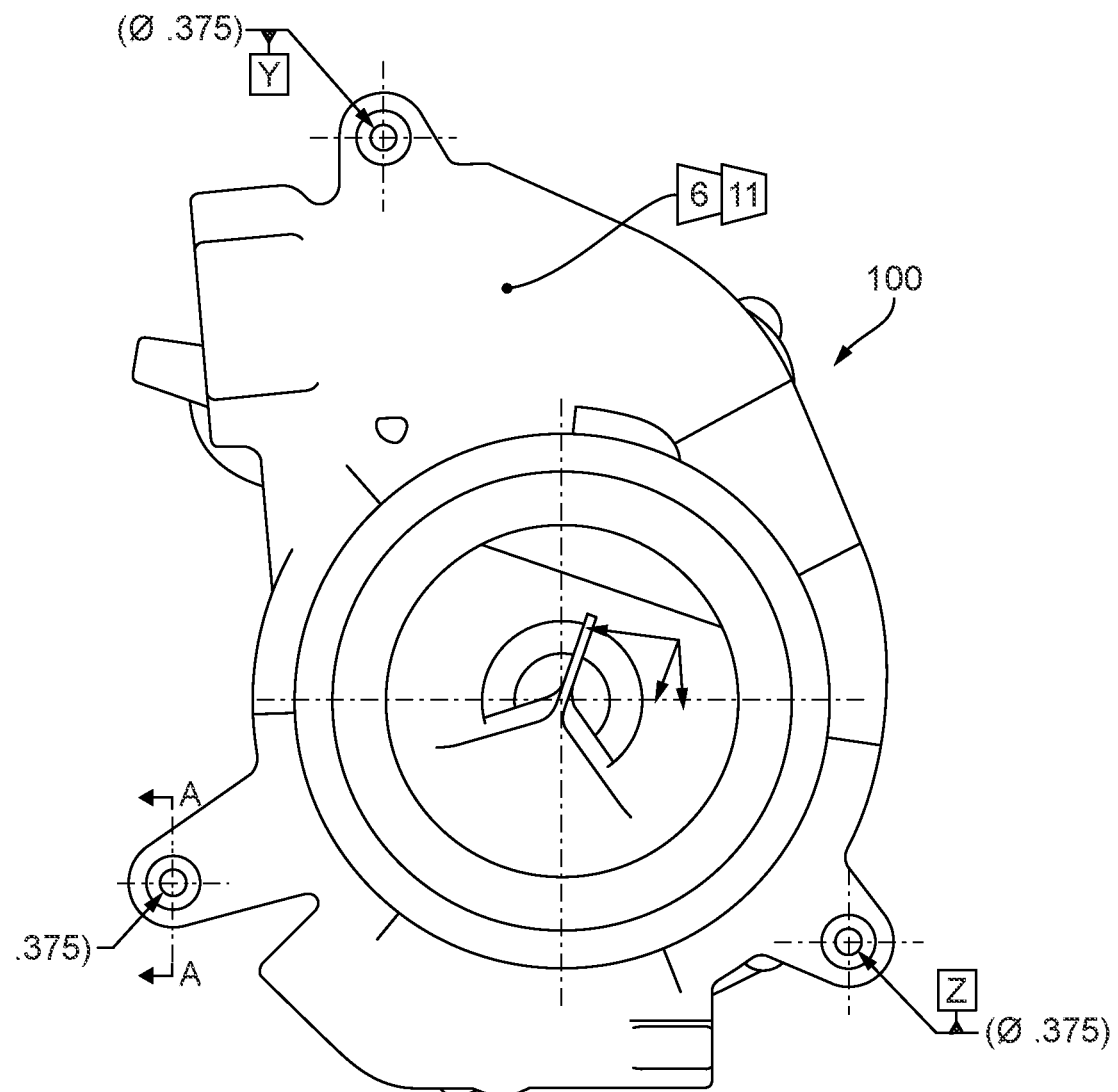
FIG. 1O is a bottom up plan view of the embodiment of FIG. 1A.
Figure 1P:
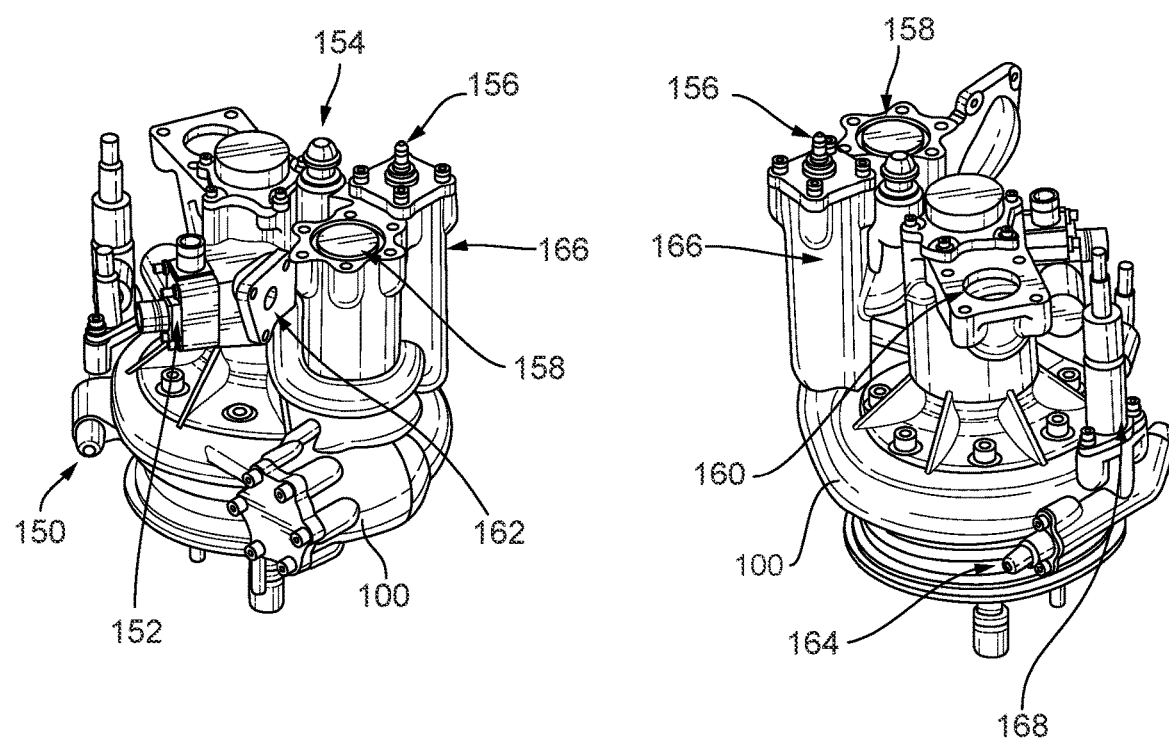
FIG. 1P illustrates views of an embodiment of a fluid pump assembled utilizing an embodiment of a pump case of FIG. 1A, and indicating locations of certain components, inlets, and outlets.

FIGS. 1A-1P show various views of an embodiment of a fluid pump case 100 to illustrate the 3-dimensional structure of the fluid pump case 100 and an embodiment of a build orientation thereof. FIG. 1A is a top perspective view of an embodiment of a fluid pump case 100 in accordance with this disclosure. FIG. 1B is an underside perspective view of the embodiment of FIG. 1A. FIG. 1C is a perspective view of the embodiment of FIG. 1A shown relative to a build plate in an embodiment of a tilted build orientation for additive manufacturing, also illustrating a location of a build plate coordinate system and a part coordinate system. FIG. 1D is a front elevation view of the embodiment of FIG. 1C, showing an embodiment of an angle defined between a first pair of axes of the coordinate systems. FIG. 1E is a top down plan view of the embodiment of FIG. 1D, showing an embodiment of an angle between another pair of axes of the coordinate systems. FIG. 1F is another perspective view of the embodiment of FIG. 1C. FIG. 1G is another front top perspective view of the embodiment of FIG. 1C. FIG. 1H is a rear perspective view of the embodiment of FIG. 1C. FIG. 1I is a cross-sectional perspective view of the embodiment of FIG. 1C, taken at a diagonal line relative to the build plate. FIG. 1J is a cross-sectional perspective view of a portion of the embodiment of FIG. 1C. FIG. 1K is a cross-sectional view of the embodiment of FIG. 1C, shown sectioned in a plane approximately parallel to that of FIG. 1I, looking in an opposite direction. FIG. 1L is a cross-sectional view of a portion of the embodiment of FIG. 1C, sectioned in a plane approximately orthogonal to that of FIG. 1K. FIG. 1M is a top down plan view of the embodiment of FIG. 1A. FIG. 1N is an elevation view of the embodiment of FIG. 1A. FIG. 1O is a bottom up plan view of the embodiment of FIG. 1A. FIG. 1P illustrates views of an embodiment of a fluid pump assembled utilizing an embodiment of a pump case of FIG. 1A, and indicating locations of certain components, inlets, and outlets.

In accordance with at least one aspect of this disclosure, referring generally to FIGS. 1A-1P, a method for manufacturing a fluid pump (e.g., as shown assembled in FIG. 1P) can include additively manufacturing a fluid pump case 100 (e.g., as shown in FIGS. 1A and 1B) in a tilted orientation (e.g., as shown in FIGS. 1C, 1D, 1E, 1F, 1G, 1H, 1I, 1J, 1K, and 1L) such that no non-build plate support structure (i.e., build plate support structure being support structure that is attached to the build plate) is used in any internal apertures of the fluid pump case 100 except for only coincidental support structure (e.g., support structure 103a, 103b, 103c as shown in FIGS. 1I and 1M) in one or more coincidental locations 101a, b, c (e.g., as shown in FIGS. 1A and 1M) that are already intended to be subjected to post process milling unrelated to the coincidental support structure. For example, such locations can be locations where post process milling (e.g., any suitable subtractive process) would be required (e.g., for a valve body 200) to achieve certain surface finishes and/or tighter tolerances than available with additive manufacturing (e.g., laser powder bed fusion). Various views of an embodiment of the tilted orientation of a suitable embodiment of the pump case 100 is shown in FIGS. 1C-1L.

Certain embodiments may include build plate support structure where desired (e.g., for facilitating the tilted orientation). However, certain embodiments may not require certain support structure (e.g., any, build plate support structure, or other support structure) and support structure may not be desired, in which case build plate support structure and/or other support structure can be avoided.

In certain embodiments, the method can include milling the one or more coincidental locations 101a, b, c to a final shape and/or finish, and in the process, eliminating the coincidental support structure. Any other suitable post processing in addition to or alternative to milling are contemplated herein.

The one or more coincidental locations 101a, b, c can be one or more valve bodies of the fluid pump case 100 configured to house valve components. The valve bodies can be portions of a fluid pump case 100 (e.g., integral in the pump case 100 as shown) that are configured to house valve components to form a valve, for example.

As illustrated in FIGS. 1C-1E, the tilted orientation can include a tilt in at least two axes. A Cartesian build plate coordinate system 105 can be defined relative to a build plate 107. The Cartesian build plate coordinate system 105 can include a build plate G-axis, a build plate F-axis, and a build plate H-axis, e.g., as shown. The G, F, and H axes are orthogonal as shown. The H-axis can be a vertical axis, for example. As shown, the build plate 107 can have a planar shape defined in a build plate G-F plane (the plane defined between the build plate G and F axes).

A Cartesian part coordinate system 109 can be defined relative to the fluid pump case 100, e.g., as shown. Similar to the build plate coordinate system 105, the Cartesian part coordinate system 109 can include a part G-axis, a part F-axis, and a part H-axis (e.g., each axis being orthogonal with the others, the H-axis being the vertical axis). As shown, the part H-axis can be aligned with a center axis of a first opening 111a (e.g., a pump inlet).

In certain embodiments, as shown in FIG. 1D, the tilted orientation can be such that the part H-axis is tilted relative to the build plate H-axis by about 40 degrees to about 45 degrees in the build plate F-H plane. As shown in FIG. 1E, the part G-axis can also be tilted from the build plate G-axis by about 50 degrees to about 55 degrees in the build plate G-F plane. In the embodiment shown, the tilted orientation can be such that the part H-axis is tilted relative to the build plate H-axis by about 43.6 degrees in the build plate F-H plane, and the part G-axis is tilted from the build plate G-axis by about 52.4 degrees in the build plate G-F plane.

The fluid pump case 100 can include a plurality of openings 111b, 111c, 111d, 111e defining a plurality of parallel axes (e.g., center axes) that are parallel with the part H-axis. The fluid pump case 100 can include at least one opening 113 defining a non-parallel axis (e.g., the center axis thereof) that is not parallel with the part H-axis. In certain embodiments, the at least one non-parallel axis of the at least one opening 113 can be orthogonal to the parallel axes of openings 111a, b, c, d, e. Coincidental support structure can be built within at least one of the plurality of openings, e.g., openings 111b, 111d, 111e.

In accordance with at least one aspect of this disclosure, a non-transitory computer readable medium can include computer executable instructions configured to cause a computer to execute a method. The method can include operating an additively manufacturing machine to build a fluid pump case layer by layer in a tilted orientation such that no non-build plate support structure is used in any internal apertures of the fluid pump case except for only coincidental support structure in one or more coincidental locations that are already intended to be subjected to post process milling unrelated to the coincidental support structure. The method can be the same or similar to any method disclosed herein, e.g., as described above. Any suitable other method(s) and/or portion(s) thereof are contemplated herein.

In accordance with at least one aspect of this disclosure, an additive manufacturing system can have a non-transitory computer readable medium as disclosed herein, e.g., as described above. In accordance with at least one aspect of this disclosure, embodiments can include a means for additively manufacturing a fluid pump case. Embodiments can include fluid pump case means, e.g., as shown in the figures and/or described above.

In accordance with at least one aspect of this disclosure, a fuel pump 99 (e.g., as shown in FIG. 1P) for an aircraft can include a fluid pump case, e.g., fluid pump case 100 formed by any suitable method disclosed herein, e.g., as described above. The fluid pump 99 can include one or more fluid pump components known to those having ordinary skill in the art disposed within the fluid pump case 100, e.g., an ejector inlet 150, 1 shut off solenoid 152, a BSD outlet 154, a cooling flow return 156, an augmentor discharge 158, a main flow inlet 160, an ejector outlet 164, a selector valve 166, a pressure temperature sensor 168, an impeller (not shown), and any other suitable pump components appreciated by those having ordinary skill in the art (e.g., for an augmentor fuel pump for aircraft).

To aid in defining the shown embodiment of a build orientation, below provided in Table 1 is an embodiment of positions of noted points shown in FIG. 1C relative to the build plate coordinate system. Any other suitable positions that achieve similar results are contemplated herein. The positions are shown in inches.

TABLE 1

| | CO-ORDINATES | | |
|---|---|---|---|
| POINTS | F-BASIC | G-BASIC | H-BASIC |
| A | −6.0150 | −2.9647 | 11.6542 |
| B | −8.1721 | −1.3031 | 10.1004 |
| C | −2.4793 | .5027 | 4.1281 |
| D | .0000 | .0000 | .0000 |

An embodiment of diameters of openings in the fluid pump case 100 is shown below in Table 2. Any other suitable dimensions are contemplated herein. The dimensions below are reflected in inches.

TABLE 2

| POINTS | DIAMETER |
|---|---|
| 1 | Ø 1.678 ± .005 |
| 2 | Ø 1.730 |
| 3 | Ø 0.435 |
| 4 | Ø 1.310 |
| 5 | Ø 1.350 |
| 6 | Ø .500 |
| 7 | Ø .311 |
| 8 | NOT APPLICABLE |

Embodiments can include a certain shape (e.g., of one or more channels) and a tilted orientation thereof to allow building with additive manufacturing efficiently. Embodiments can include an orientation of build to avoid extra support structure that would not be machined away with already existing machining. For example, each valve body in a traditional fluid pump case can be milled after traditional casting to provide a final shape and a final finish. Such post processing can be required for additive manufacturing as well. Thus, each valve body can have support structure added therein without adding additional steps of milling. Accordingly, the tilted orientation can be selected such that support structure internal to the device is only utilized where milling is necessary.

Embodiment of additive manufacturing include laser powder bed fusion. Any other suitable process is contemplated herein. In certain embodiments, supports are not permissible on any internal surfaces of the part that are not already going to be machined away. Certain applications (e.g., for aircraft fuel pumps) may require the pump case to be clean, burr free, and powder free, and some surfaces may require a machined finish while others may not.

In certain embodiments, the recoater direction (e.g., the direction a powder recoater of a powder bed fusion machine moves to recoat) can be in the positive F-axis direction of build plate coordinate system (e.g., the direction arrow is pointing in the FIG. 1C). The build direction can be the positive H-axis direction of build plate coordinate system (e.g., vertical).

Embodiments can allow additive manufacturing of an augmentor fuel pump case which was initially designed and optimized for a casting manufacturing process. Castings generally have high startup cost and long lead times. Additive manufacturing (AM) can be an enabling technology for this part to save costs in the supply chain and maintain or improve part performance when properly redesigned for both performance, cost, and manufacturability.

The AM build configuration as disclosed herein can be an intermediate step, as there can be post AM processes that are used to create the final part (e.g., machining the valve bodies to finish while removing any support structure). The orientation, support structure, and modifications of embodiments of an additively manufactured fluid pump case are unique compared to a traditional cast pump case.

Through utilizing a tilted orientation as disclosed above, and design features that avoid the use of internal support structures in hard to reach or traditionally unfinished locations, embodiments of a method can enable improved manufacturing of an augmenter fuel pump through additive manufacturing For example, embodiments of the fluid pump case can have a set of unique design changes, support structures in only coincidental locations, and an orientation definition to allow the pump case for the augmentor fuel pump to be additively manufactured without negatively impacting performance. Embodiments utilizing such a tilted orientation, design, and with only coincidental support structure and also enable reduced AM post processing cost, eliminate support removal activity required that is not incorporated in existing machine operations, allow for easy powder removal (e.g., no wells or small features), provide the same or less weight as traditional casted parts, and provide equal or better performance compared to traditional casted parts. Thus, pump cases can be additively manufactured while reducing cost and at least maintaining performance.

In accordance with at least one aspect of this disclosure, referring additionally to FIGS. 2A-2E, an additively manufactured valve body 200 for a fluid pump case (e.g., pump case 100) can include an interior surface 201 and a plurality of interior annular features 203a, 203b, 203c, 203d, 203e integrally formed with and extending radially inwardly from the interior surface 201. The interior surface 201 can form a substantially cylindrical shape, for example. The one or more annular features 203a, b, c, d, e can be positioned apart in an axial direction (e.g., along centerline axis 205) relative to each other, e.g., for forming a plurality of lands.

The valve body 200 can include a support structure 207a, b, c, d (e.g., a plurality thereof as shown) formed integrally with and connecting a lower-in-build annular feature (e.g., annular feature 203b) to a higher-in-build annular feature (e.g., annular feature 203c). For example, as shown in FIG. 2D, the relative higher and lower positions can be seen relative to the build plate 107. The support structure 207a, b, c, d can be any of the support structure 103a, b, c, d as described above (e.g., support structure 103a in FIG. 1M is the same as support structure 207d shown in FIG. 2A).

Figure 2A:
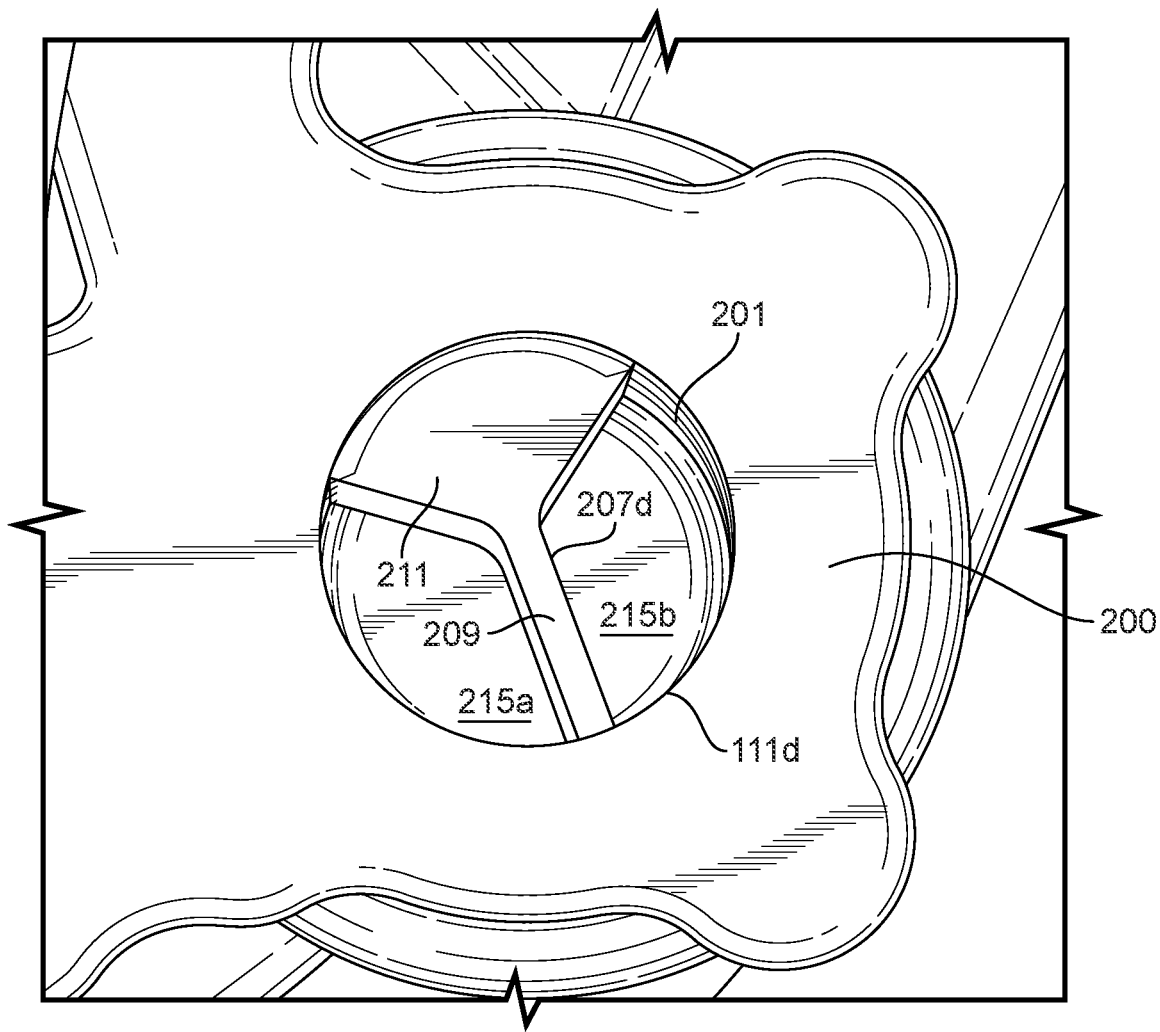
FIG. 2A is an elevation view of an embodiment of a valve body (e.g., for a cooling flow return valve) of a fluid pump case of FIG. 1A in accordance with this disclosure, e.g., as shown in section in FIG. 1I.
Figure 2B:
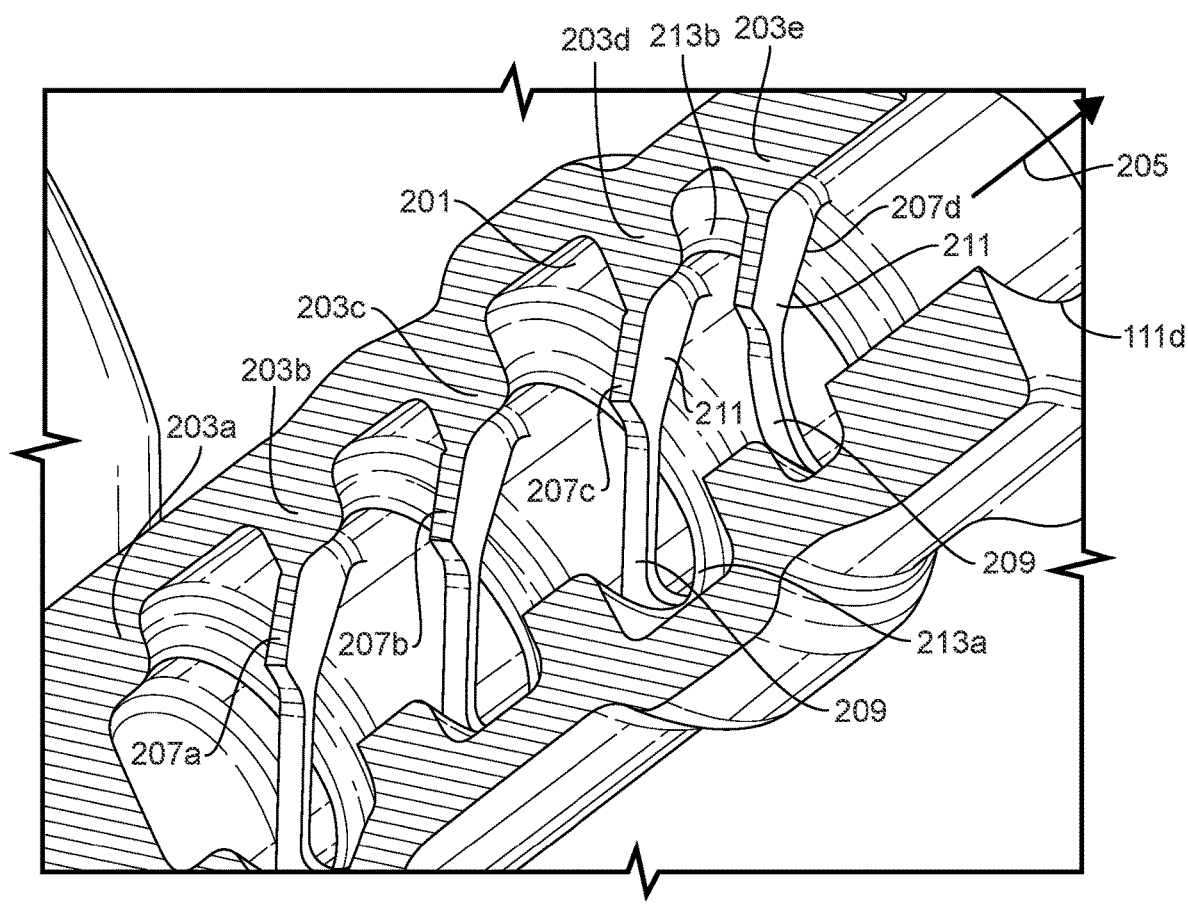
FIG. 2B is a cross-sectional view of the embodiment of FIG. 2A.
Figure 2C:
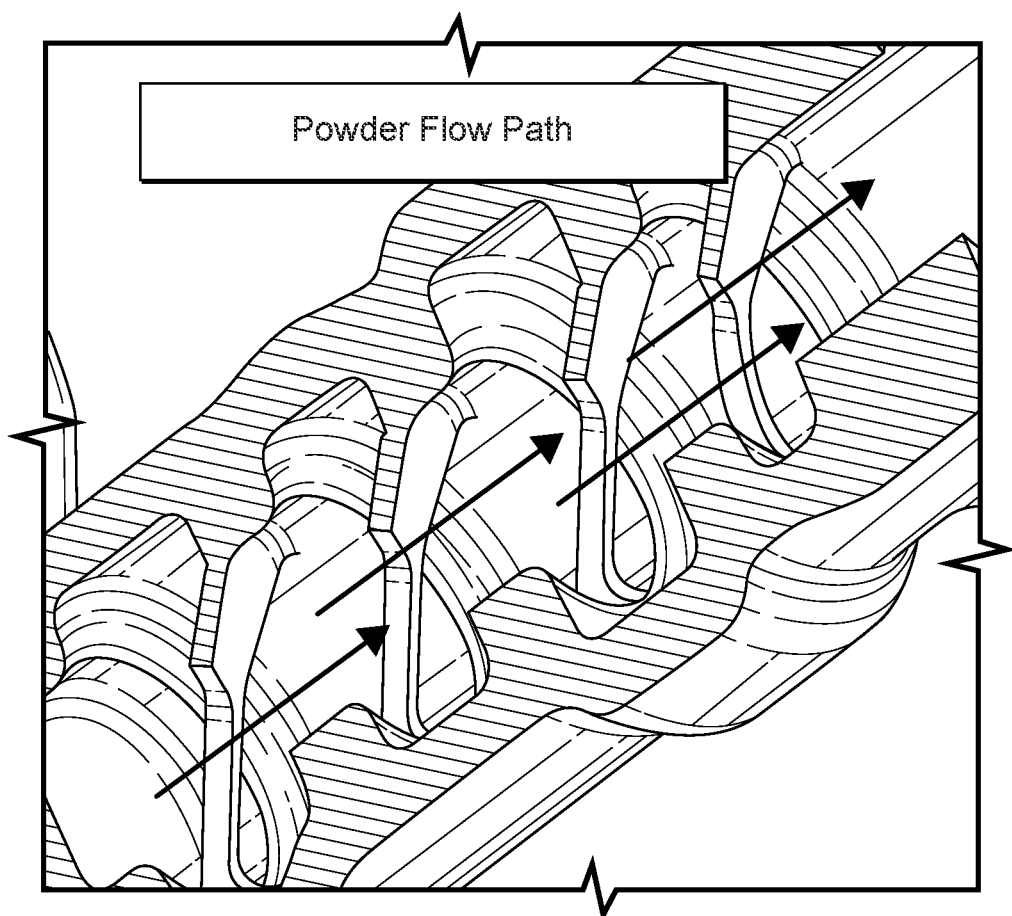
FIG. 2C is a schematic view of the embodiment shown in FIG. 2B, illustrating a powder flow path through openings defined by the coincidental support structure.
Figure 2D:
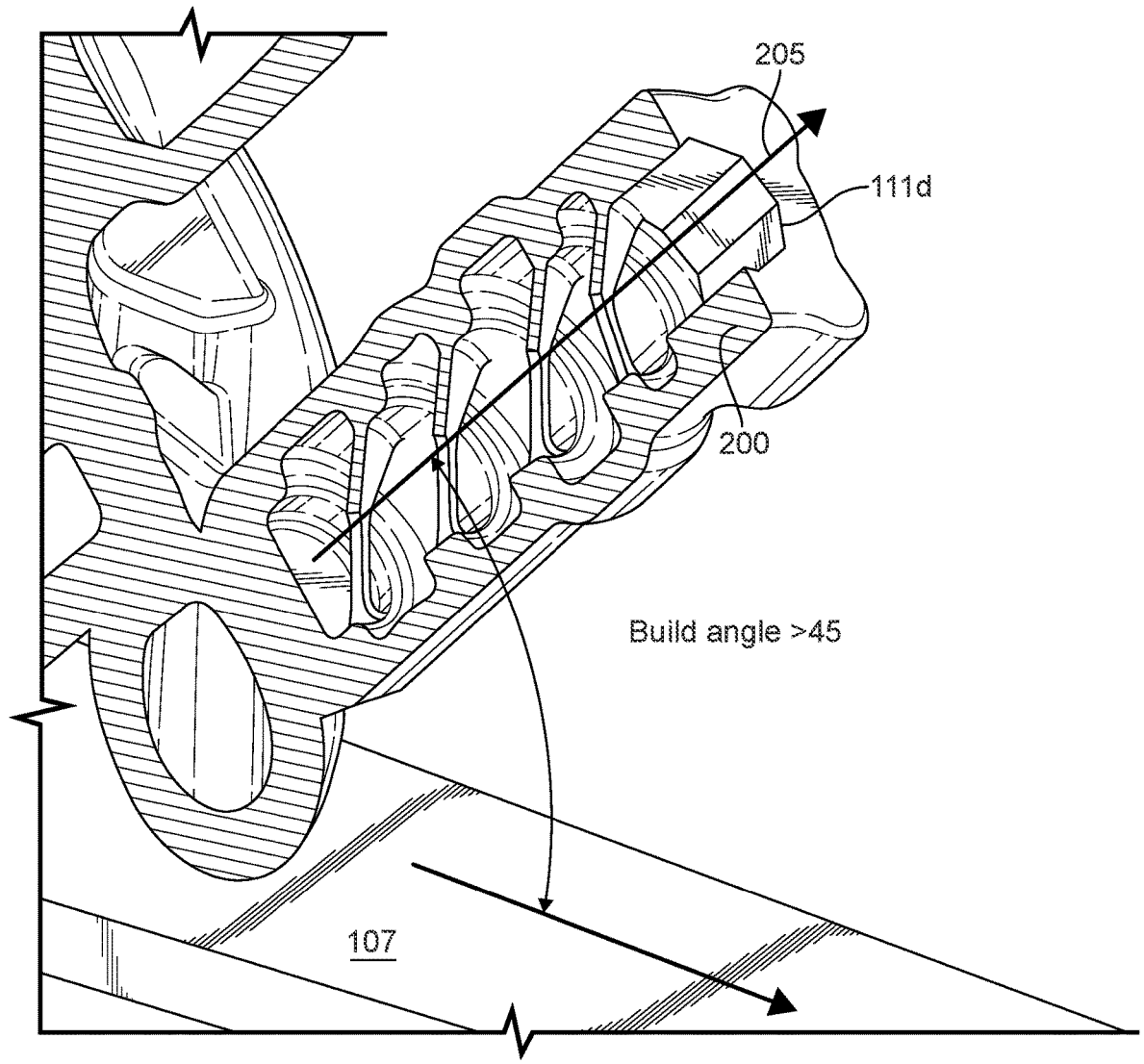
FIG. 2D is a cross-sectional perspective view of the embodiment of FIG. 2A, showing an embodiment of a build angle between a center axis of the valve body and a surface of a build plate.

In certain embodiments, as best shown in FIG. 2A, the support structure 207 can include a filled-in Y-shape. Such a shape can allow for powder removal and cleaning, while providing adequate support and limiting waste material when removed, for example. The support structure 207a, b, c, d can form openings 215a, 215b, for example, allowing powder removal.

For example, the support structure 207a, b, c, d can include a stem 209 and a wide portion 211 extending from the stem 209. The stem 209 can be thinner than the wide portion 211. The wide portion 211 can include a quasi-circular shape, or any other suitable shape, and can be solid (e.g., as shown) or have any suitable discontinuities.

The stem 209 of the support structure 207a, b, c, d can be integrally formed with and extend from a lower-in-build portion, e.g., portion 213a of the lower-in-build annular feature (for example, feature 203c). The wide portion 211 can extend from the stem 209 and can be integrally formed with and connected to a higher-in-build portion (e.g., portion 213b) of the higher-in-build annular feature (e.g., feature 203d).

Figure 2E:
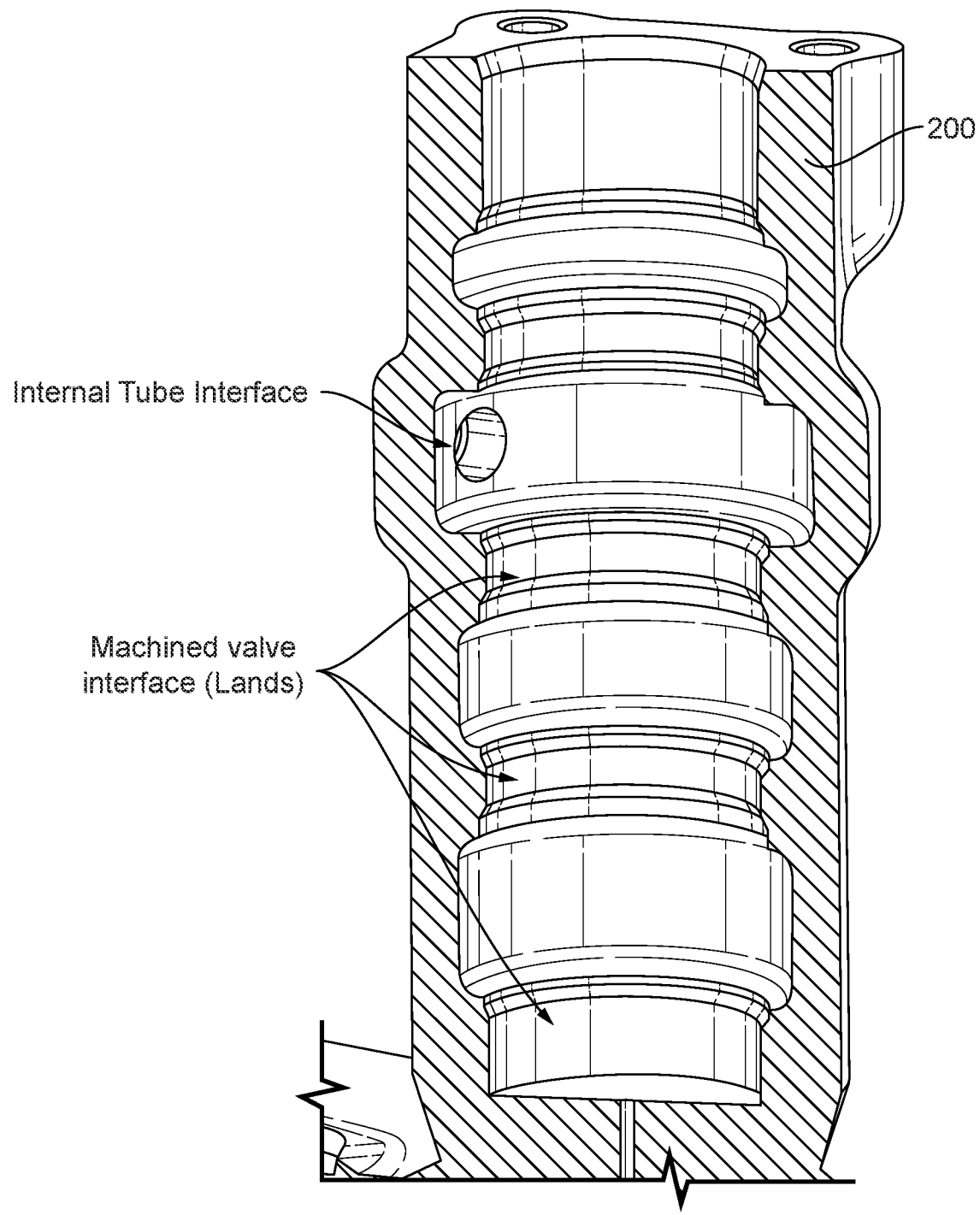
FIG. 2E illustrates an embodiment of a valve body after machining in accordance with this disclosure, showing the coincidental support structure removed.

Any suitable number of support structures are contemplated herein (e.g., to provide support during build for any would-be overhanging features). The valve body 200 can include a support structure 207a, b, c, d connecting to each annular feature 203a, b, c, d, e (e.g., one connecting each pair such that the total is one less than annular features). As shown, each support structure 207a, b, c, d can extend between each successive pair of annular features 203a, b, c, d, e. In this regard, the support structure 207a, b, c, d can be milled away in the process of milling the annular features 203a, b, c, d, e to their final shape and/or finish since all support structure can connect to the inner diameter of the annular features. An embodiment of a milled valve body 200 is shown in FIG. 2E.

In certain embodiments, as shown in FIG. 2D, the valve body 200 can be constructed at an angle between the axial direction 205 and a surface of the build plate 107 of greater than about 45 degrees. Any other suitable angle is contemplated herein (e.g., to allow suitable additive manufacturing of the valve body 200 (e.g., with the case 100 as described above). For example, the build angle can be such that no unsupported surface is less than about 20 degrees from horizontal.

The valve body 200 can be additively manufacture as part of the case 100 as described above. Any other suitable application (e.g., in isolation of the case) is contemplated herein. In certain embodiments, the disclosed embodiments of support structure can be applied to any channel shaped body build at a suitable angle using additive manufacturing.

In accordance with at least one aspect of this disclosure, an additively manufactured fluid pump case (e.g., case 100) can include a valve body. The valve body can be any suitable valve body as disclosed herein, e.g., valve body 200 as described above. In accordance with at least one aspect of this disclosure, a method can include additively manufacturing a valve body (e.g., valve body 200) of fluid pump case (e.g., fluid pump case 100). The method can also include milling away the support structure 207a, b, c, d while finish-milling the valve body 200, for example.

In certain embodiments, and as disclosed above with respect to FIGS. 1A-1P, additively manufacturing can be or include laser power bed fusion. Any other suitable process is contemplated herein (e.g., fused deposition, etc.). The method can include removing powder from within the valve body 200 before milling through openings 215a, 215b defined by the support structure 207a, b, c, d. The method can include inserting a valve (not specifically shown) into the valve body 200 (e.g., after being milled). For example, the valve can be a selector valve having a circumferentially defined flow path based on its axial and/or rotational position within the valve body 200.

This method can include any other suitable method(s) and/or portions thereof. Embodiments can include a means for additively manufacturing a valve body (e.g., valve body 200).

In certain additive manufacturing processes, there is a need for a powder flow path to remove powder from internal channels of parts. Embodiments disclosed herein provide support structure than can include a trunk extending upward and forward from a lower land, and a branch portion that contacts next land up from lower land. Certain fuel pumps are complex in shape and can benefit from embodiments of support structure disclosed in FIG. 2A-2E to provide additive manufacturing solutions that can save in powder removal costs by reducing powder removal time. Accordingly, embodiments of the support structure of FIGS. 2A-2E can provide a reduced additive manufacturing post processing cost, easy powder removal, increased volume air/powder/medium, reduced sintered feed stock material, no modification of machining process, and the same or better valve performance. Valve body geometry and orientation can be a performance consideration of the part, and the positioning thereof can be a function of the mating valve assembly's straight line action and associated parts.

When valve bodies are at low build angles (e.g., caused by an overall orientation that is greater than about 45 degrees), they can have features that present build risk. Traditional redesigning solutions such as removing an overhanging surface and creating small powder removal holes drive up powder removal cost or are not feasible. By applying embodiments of the support structure disclosed (e.g., a "Y" support geometry) to connect surfaces that are to be machined, valve bodies that are to be built via additive manufacturing and oriented at about 45 degrees from horizontal can be supported while allowing ease of powder removal and minimizing sintered material that will become machined stock.

Fuel pumps can use valves housed in such valve bodies as described above to regulate flow to primary and secondary systems of the pump. Valve bodies can have internal tubes that interface in the grooves (between annular features) of the body. The mating valve can interface with the lands of the valve body. Traditionally, these surfaces in the valve body have only be subtractively processed (e.g., machined/milled) to meet interface requirements regardless of manufacturing method. Any other suitable additive or subtractive post processing finishing method is contemplated herein.

Figure 3A:
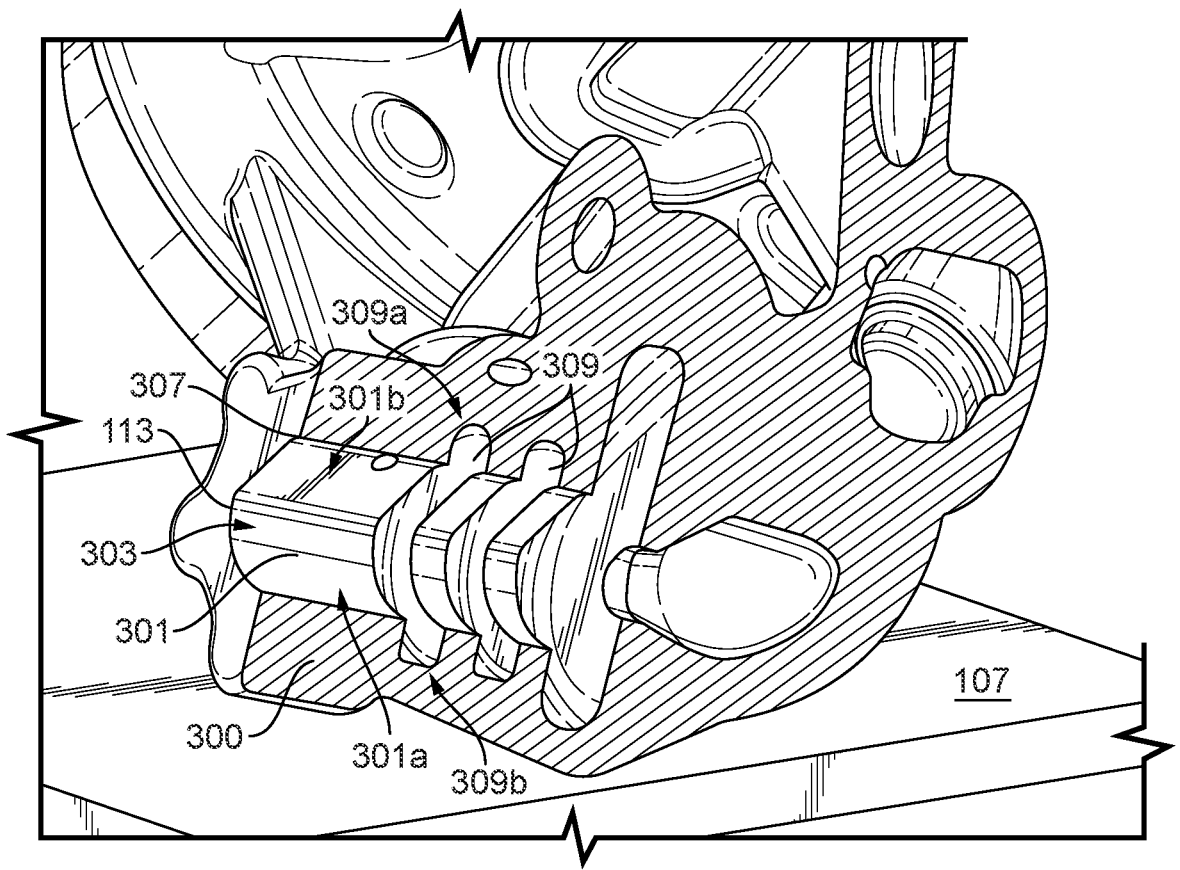
FIG. 3A is a cross-sectional perspective view of an embodiment of another valve body (e.g., for a discharge valve) of the fluid pump case of FIG. 1A in accordance with this disclosure, e.g., as shown in section in FIG. 1L.
Figure 3B:
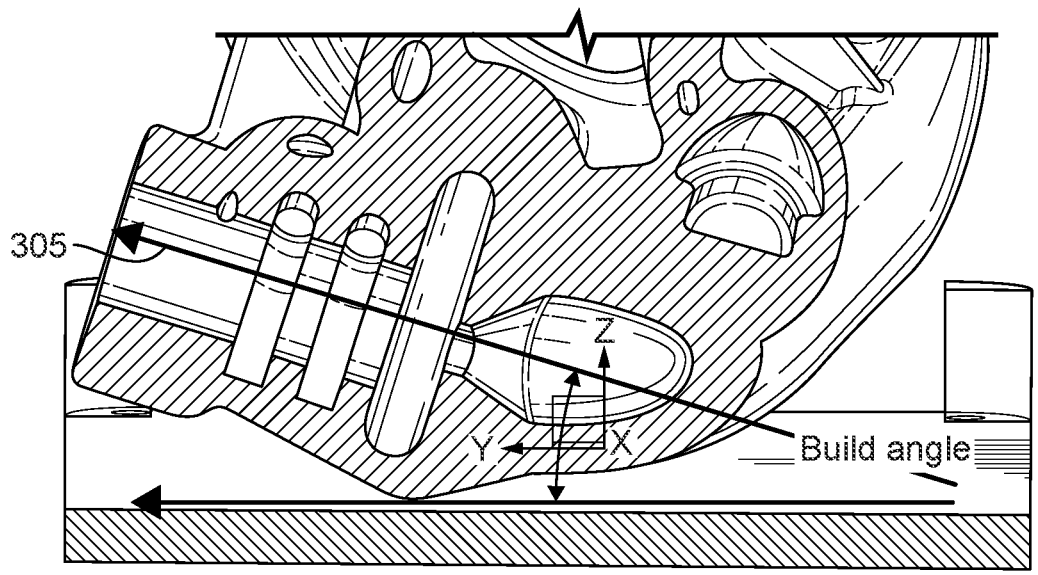
FIG. 3B is a cross-sectional view of the embodiment of FIG. 3A, showing an embodiment of a build angle between a center axis of the valve body and a surface of a build plate.
Figure 3C:
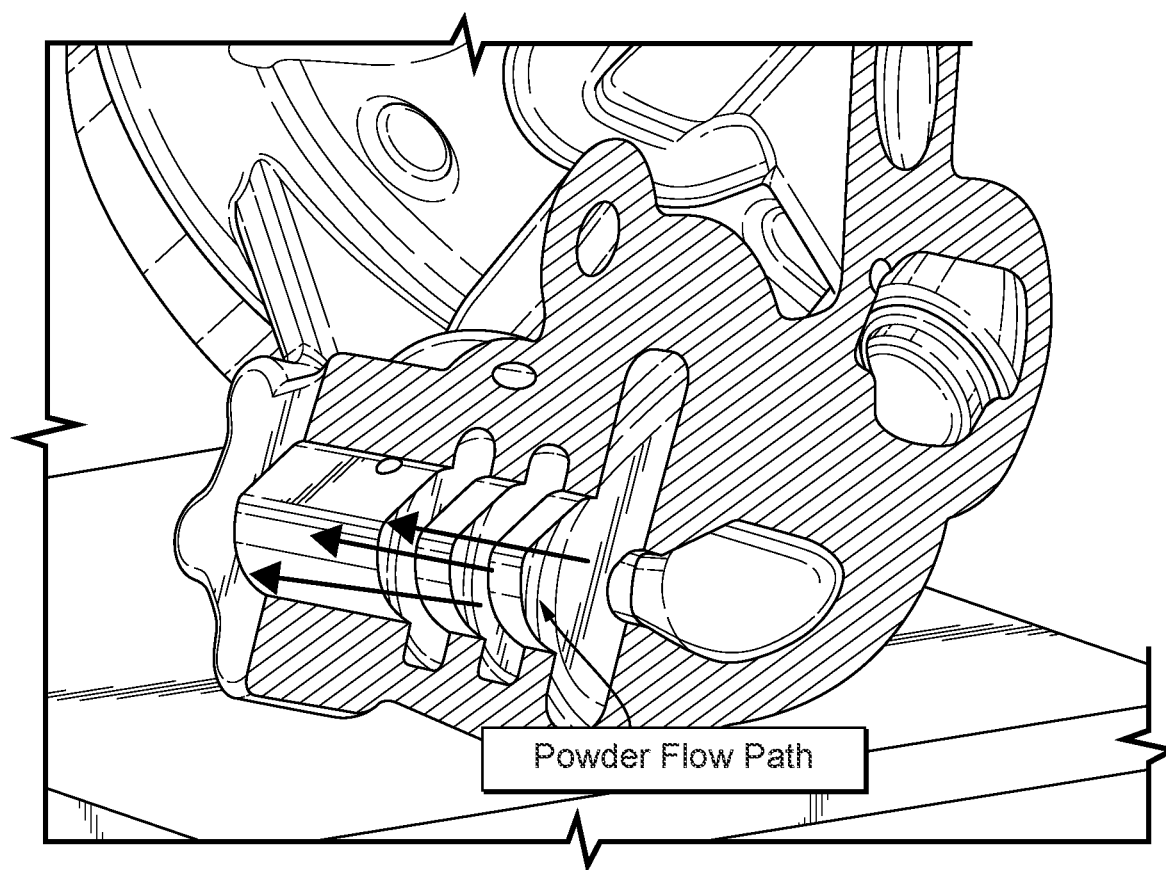
FIG. 3C is a cross-sectional view of the embodiment of FIG. 3A, illustrating a powder flow path through the valve body built without support structure as shown.

In accordance with at least one aspect of this disclosure, referring additionally to FIGS. 3A-3D, an additively manufactured valve body 300 for a fluid pump case (e.g., pump case 100) can include an interior surface 301 defining a main channel 303 along an axis 305 (e.g., as shown in FIG. 3B) in an axial direction. The channel 303 can have a non-uniform cross-section configured to allow the valve body 301 to be additively manufactured without support structure, e.g., as shown in FIG. 3A.

In certain embodiments, as can be seen in FIG. 1C, for example, the non-uniform cross-section can have a teardrop shape. For example, the interior surface 301 can include a curved lower-in-build portion 301a and a ramped higher-in-build portion 301b that forms a V-shape extending from the curved lower-in-build portion 301a. As shown, the curved lower-in-build portion 301a can have a semicircular cross-section. The ramped higher-in-build portion 301b can include a curved peak 307 where the ramped surfaces meet. The ramped surfaces can form any suitable angle extending from the lower-in-build portion 301a (e.g., about 30 to about 45 degrees). In certain embodiments, the valve body 300 can be additively manufactured such that the axis 305 forms an angle of about 45 degrees or less with a surface of the build plate 107 on which the valve body 300 is built.

The interior surface 301 can further define one or more annular grooves 309 extending radially outwardly from the main channel 303. The one or more annular grooves 309 can include an asymmetric groove profile. For example, a higher-in-build portion 309a of the one or more annular grooves 309 can include a curved shape in the axial direction (e.g., U-shaped cross-section as shown in FIG. 3A), and a lower-in-build portion 309b of the one or more annular grooves 309 can include a straight shape (e.g., rectilinear shaped cross-section as shown in FIG. 3A) in the axial direction.

In certain embodiments, the one or more annular grooves 309 can be two annular grooves 309 positioned apart in an axial direction relative to each other, e.g., as shown. Any suitable number of annular grooves 309 are contemplated herein.

Figure 3D:
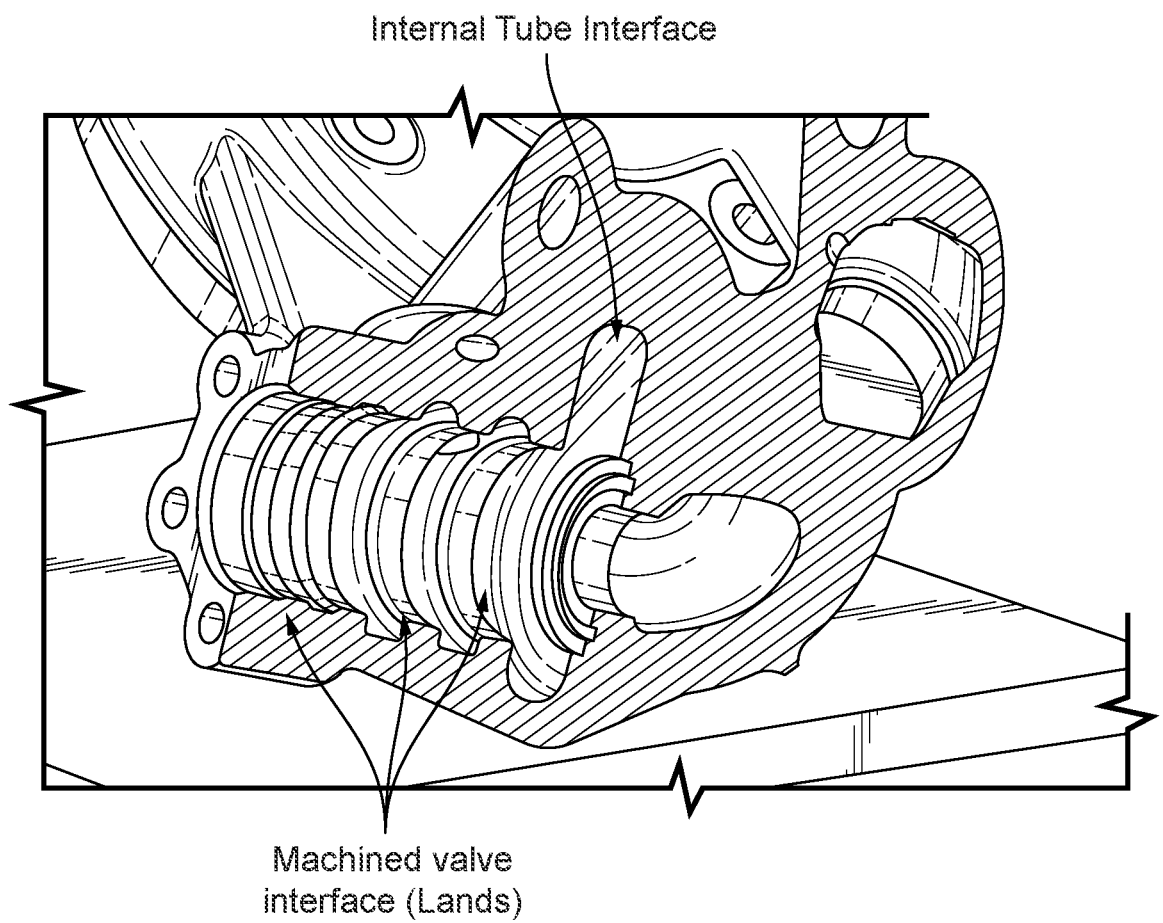
FIG. 3D an embodiment of a valve body after machining in accordance with this disclosure, showing internal shape changed compared to the shape as additively manufactured.

The internal shape of the valve body 300 can enable additive manufacturing of the valve body 300, e.g., as part of the fluid pump case 100 in the orientation disclosed in relation to FIGS. 1A-1P without utilizing support structure. For example, the valve body 300 can be positioned less than about 45 degrees in the tilted build orientation as described above. The shape of the interior surface 301 can be milled after additive manufacturing into a uniform cross-sectional shape (e.g., a cylindrical shape) as shown in FIG. 3D (e.g., with milled lands for a valve assembly (e.g., similar as disclosed above in FIGS. 2A-2E). While the valve body 300 is shown integrated with the fluid pump case 100, any suitable application (e.g., in isolation of the pump case 100) is contemplated herein.

In accordance with at least one aspect of this disclosure, an additively manufactured fluid pump case (e.g., case 100) can include a valve body 300 as disclosed herein, e.g., as described above. In accordance with at least one aspect of this disclosure, a method of manufacturing a fluid pump case (e.g., case 100) can include additively manufacturing a valve body 300 as disclosed herein, e.g., as described above, and machining the main channel 303 to have a different cross-section to allow the valve body 300 to receive one or more valve components while leaving the one or more annular grooves 309.

In accordance with at least one aspect of this disclosure, embodiments can include fluid pump case means for use as a fluid pump housing, the fluid pump case means having valve body means configured to allow additive manufacturing of the fluid pump case without building support structure in the valve body.

Embodiments can have tops of grooves with a round cross-section to allow a smooth build without low overhang while the bottoms of the grooves can have a square cross-section. The total volume of the grooves can be about the same as a traditional design to allow the performance to be the same or similar to traditional embodiments. Embodiments of the valve body 300 can have a teardrop shape that allows open area for power removal, for example. As presented above, embodiments can allow for building certain valve bodies (e.g., valve body 300 of a fluid pump case 100) at build angles of less than about 45 degrees relative to the axis of channel 303.

Embodiments can include a teardrop self-supporting profile that also provide ample powder removal flow area (e.g., the whole of teardrop shaped channel 303 after additive manufacturing and before milling). By applying a unique teardrop profile to the valve body 300, coupled with an asymmetric groove using a semi-circular cross section swept into a rectangular cross section, the low angle-in-build valve body can be self-supporting without restricting powder flow.

Figure 4A:
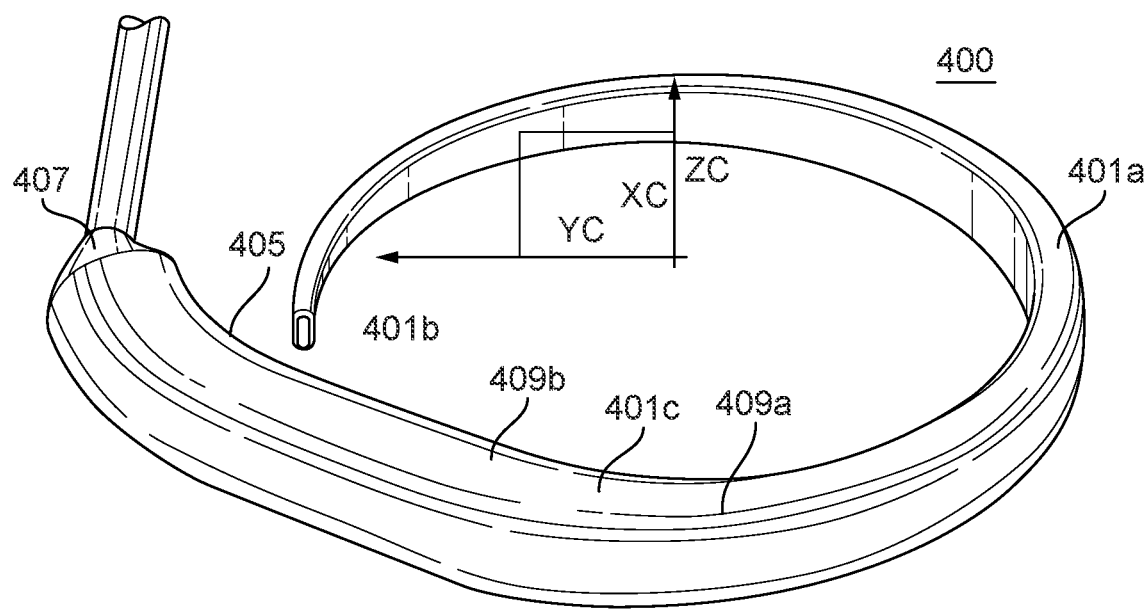
FIG. 4A is a perspective view of an embodiment of a volute, e.g., of the fluid pump case of FIG. 1A, shown in negative and in isolation.
Figure 4B:
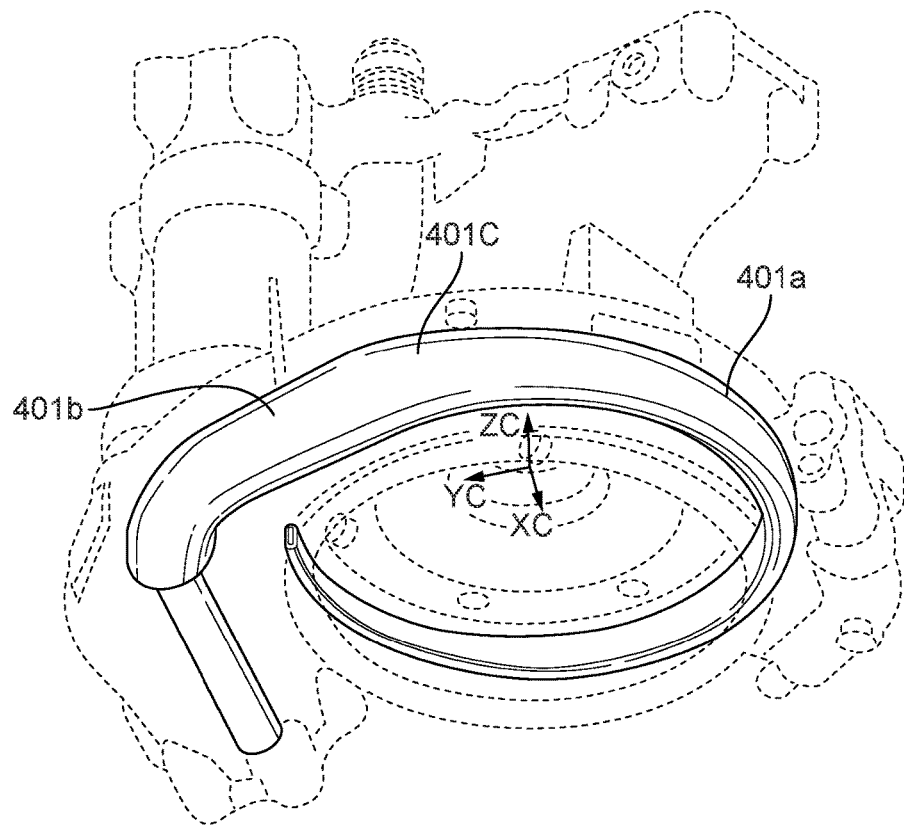
FIG. 4B shows the embodiment of FIG. 4A within a fluid pump case for context.
Figure 4C:
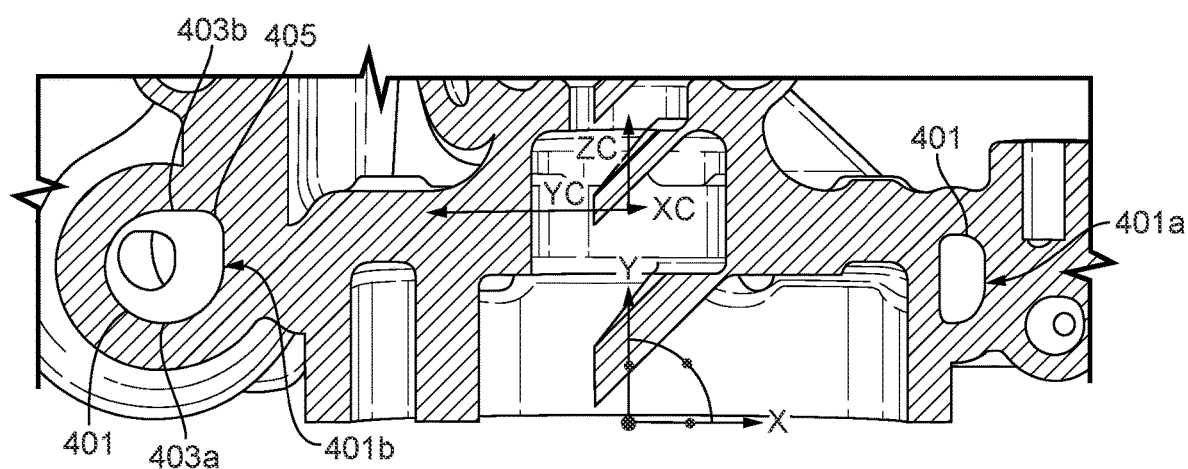
FIG. 4C is a cross-sectional view of a volute channel defining the volute of FIG. 4A, showing a teardrop shaped portion thereof.
Figure 4D:
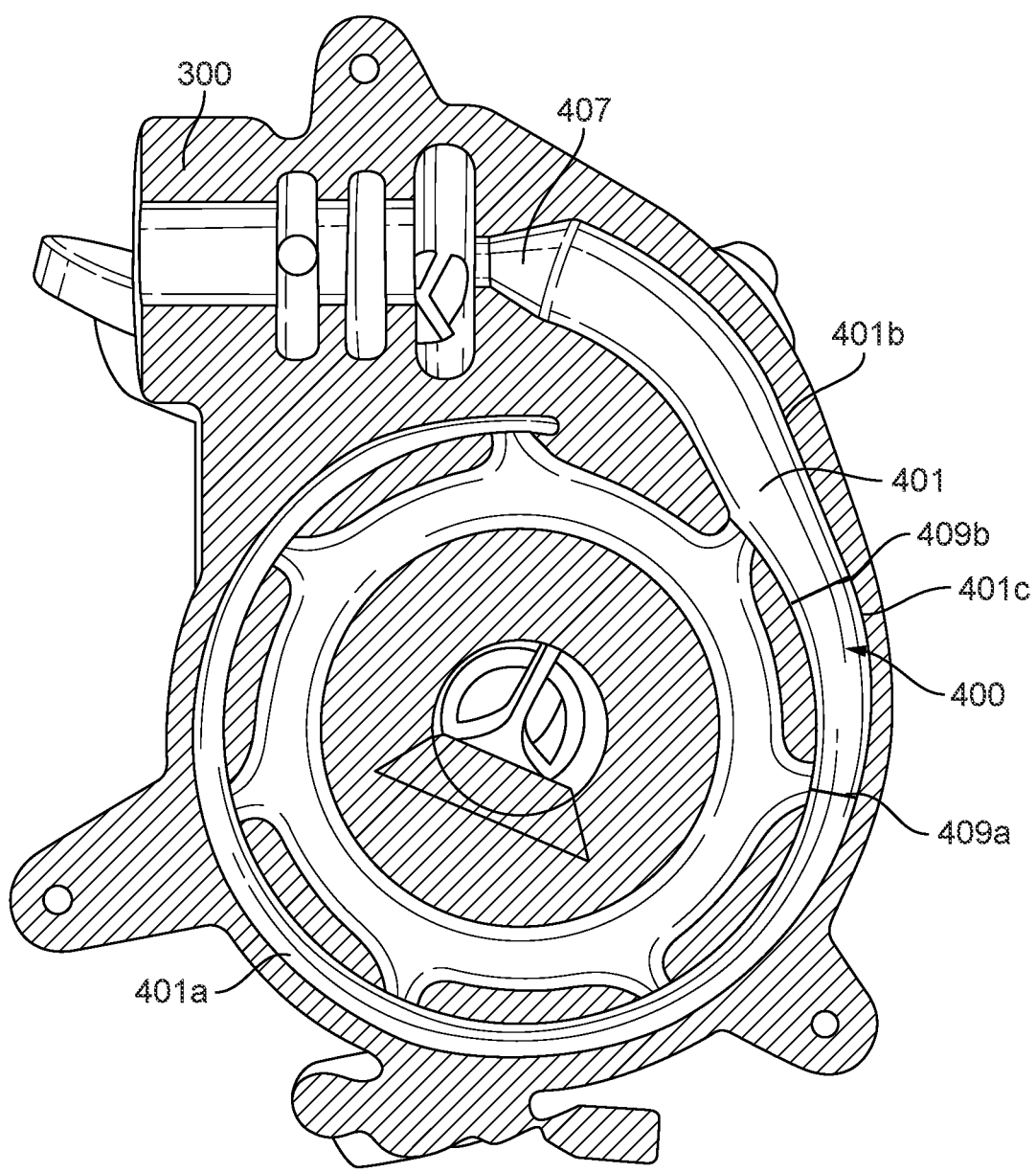
FIG. 4D is a cross-sectional view of the volute channel of FIG. 4C, shown sectioned in a plane orthogonal to the of FIG. 4C.
Figure 4E:
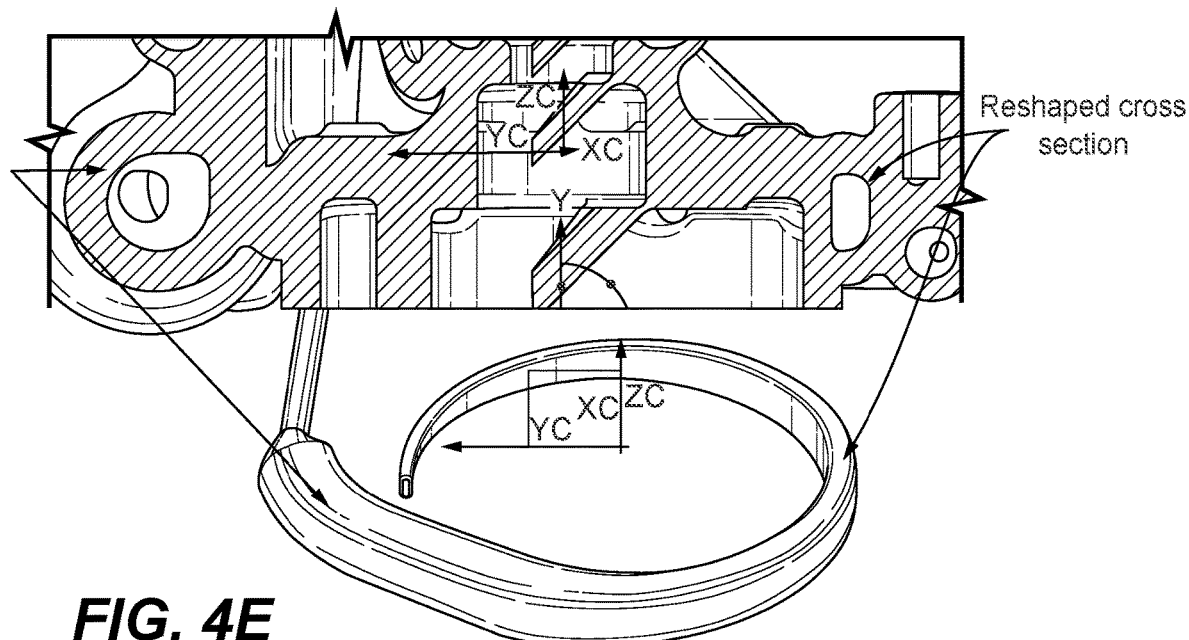
FIG. 4E is a cross-sectional view of the volute channel of FIG. 4C, showing a reducing portion of the volute channel connecting to a valve channel of a valve body.
Figure 4F:
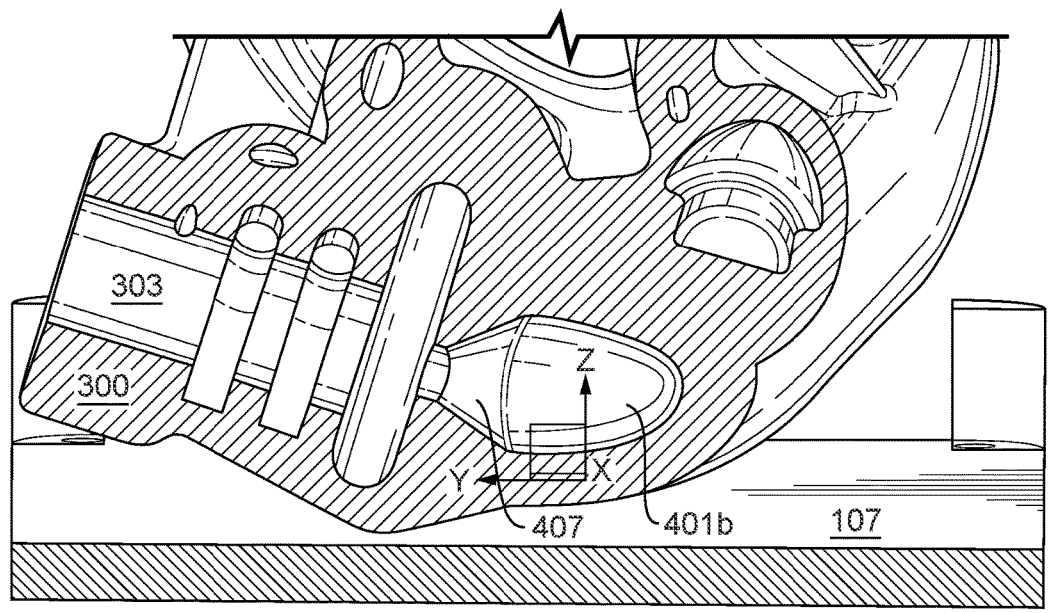
FIG. 4F is a cross-sectional view of the volute channel of FIG. 4C, shown oriented in a build orientation.

In accordance with at least one aspect of this disclosure, referring additionally to FIGS. 4A-4G, a fluid pump case, e.g., fluid pump case 100, can include an interior volute surface 401 defining a volute channel 400. The interior volute surface 401 can include a first portion 401a having a D-shaped cross-section and a second portion 401b having a teardrop shaped cross-section downstream of the first portion 401a. The interior volute surface can include a transition portion 401c between the first portion 401a and the second portion 401b having a changing cross-section (e.g., that morphs from a D-shaped cross-section to a teardrop shaped cross-section while curving as shown). The transition portion 401c can be defined between lines 409a and 409b, e.g., as shown in FIGS. 4A and 4D.

The teardrop cross-section can include a curved lower-in-build portion 403a and a ramped higher-in-build portion 403b that forms a V-shape extending from the curved lower-in-build portion 403a. In certain embodiments, the teardrop cross-sectional shape can be the same or similar to that disclosed above with respect to the valve body 300 of FIG. 3A. For example, the curved lower-in-build portion 401a can have a semicircle cross-section, e.g., as shown. The ramped higher-in-build portion can have a curved peak 405. In certain embodiments, the teardrop cross-section can be aligned with the teardrop shape of the valve body 300.

Figure 4G:
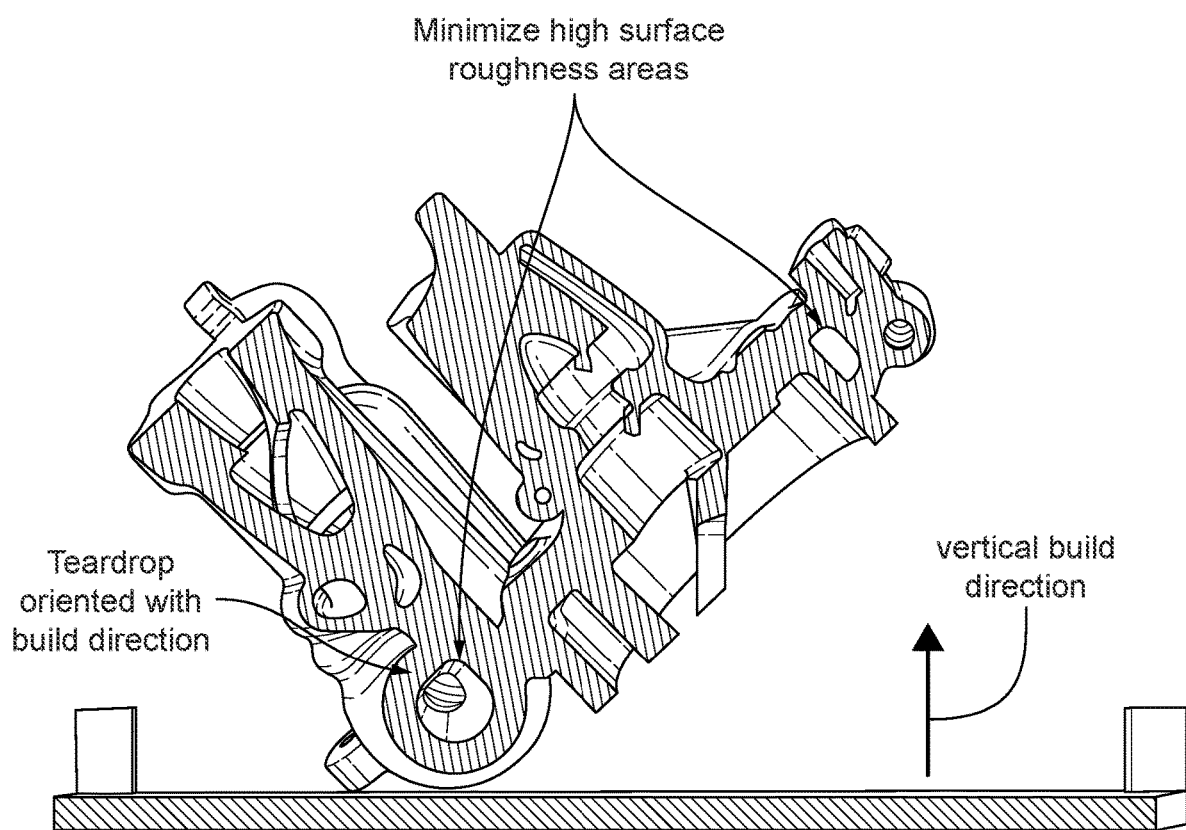
FIG. 4G is a cross-sectional view of the volute channel of FIG. 4C shown oriented in a built orientation.

The second portion 401b can be shaped such that it is additively manufactured without support structure, e.g., as shown. For example, a centerline of the peak 405 (e.g., as shown in FIGS. 4A and 4C) along the length of the second portion 401b can be coplanar with a vertical build direction (and a centerline axis of the volute channel 400) in build such that the teardrop shape is symmetric about a vertical plane (e.g., on which the vertical build axis lays), e.g., as illustrated in FIG. 4G. Any suitable variation or asymmetry that still allows building without support structure is contemplated herein. As shown, the teardrop shape is rotated about 45 (e.g., about 43.6) degrees relative to a pump centerline axis.

As shown, the first portion 401a can have an expanding flow area in a flow direction toward the second portion 401b. The second portion 401b can have an expanding flow area or constant flow area in the flow direction, for example. In certain embodiments, the volute channel 400 can consistently expand from the first portion 401a through the second portion 401b.

The volute channel 400 can further include a reducing portion 407 downstream of the second portion 401b. The reducing portion 407 can include a teardrop shape cross-section also, or any other suitable shape to allow building without support structure. The reducing portion 407 can be connected to a valve channel (e.g., channel 303) defined by a valve body (e.g., valve body 300). Embodiments can be utilized with the above disclosed fluid pump case 100 or any other suitable application (e.g., in isolation from fluid pump 100).

Embodiments can be oriented such that the peak 405 of the teardrop is positioned relative to the build area such that neither ramped wall forming the ramped higher-in-build portion will be less than about 20 degrees from horizontal, for example. The peak 405 of the teardrop shape can be in any suitable orientation as long as the build orientation of the volute channel 400 is changed to have the ramped portion where an overhang would be. The shown position of the teardrop shape is a suitable position for the tilted orientation described above with respect to FIGS. 1A-1P. The above embodiments of valve bodies 200, 300 are also shown shaped and oriented (with or without build structure as described above) to allow for building in the tilted orientation described above with respect to FIGS. 1A-1P.

Unlike certain embodiments of the valve bodies 200, 300 disclosed above, the interior surface 401 need not be milled to a final shape and can maintain the teardrop shape in the final device. While the teardrop structure allows building without support structure, it also maintains strength under pressure. Such a shape is acceptable in use without compromising function. Embodiments can include transitions before and after the teardrop that are smooth to aid in powder removal, for example, as opposed to traditional embodiments that have sharp angles that are machined away. This also reduces post processing required since the reducing portion of the volute channel is already formed to the desired shape.

In accordance with at least one aspect of this disclosure, a method can include additively manufacturing a fluid pump case to include an interior volute surface 401 defining a volute channel 400 as disclosed herein, e.g., as described above. Additively manufacturing can include aligning a centerline of the peak 405 along the length of the second portion 401b to be coplanar with a vertical build direction in build such that the teardrop shape is symmetric about a vertical plane. In accordance with at least one aspect of this disclosure, embodiments can include volute means for a fluid pump case.

Fuel pumps use volutes designed for the casting manufacturing process with input from CFD models, for example. The part can be surface finish critical, with limited to no line of sight to feature geometry. Volute design can be critical to the function of a pump as it collects and slows the flow while maintaining minimal pressure from the inlet impeller assembly. To maintain part performance, traditional volute geometry cannot be used if the pump case is to be additively manufacture while also maintaining a cost practicality.

The fuel pump volute is composed of a fluid passage that receives fuel from a series passages connected to the impeller volume, as appreciated by those having ordinary skill in the art and as shown in the above described figures (e.g., all connected to the first portion 401a and/or transition portion 401c). In pump embodiments, e.g., as shown in FIG. 1P, the volute transmits the fluid from the inlet impeller assembly to the valve system (e.g., associated with valve body 300) that connects to a fluid (e.g., fuel) discharge while maintaining minimal loss of pressure.

The volute is highly sensitive to pressure drop, which is directly affected by cross-sectional area, cross-sectional shape, volume, path, volume expansion rate, and surface roughness. Typical devices can include a semi rectangular "D" cross-section that transitions into a circle shape, however, this cannot be properly additively manufactured (e.g., at least in the tilted orientation disclosed above with respect to FIGS. 1A-1P) at least due to the fact that support structure would be required and would be difficult if not impossible to remove.

Embodiments include a teardrop non-uniform pump volute that is a self-supporting volute via a unique volute profile and shape. Embodiments can include a volute profile can transition from a CFD driven "D" shaped cross section to a teardrop shape based on part orientation. This customized feature shape driven by the part orientation can allow the fuel pump to be additively manufactured with no need for support structure, and therefore no support removal costs. Embodiments also minimize high surface roughness areas having the teardrop oriented with the build direction. Embodiments also provide a smoother volute to valve transition and powder removal and flow benefit.

Embodiments provide reduced additive manufacturing post processing costs, no support structure in the volute, easy powder removal (e.g., no wells or small features), weight neutral lighter pump cases, a more efficient structural transition from the D shaped cross-section to the teardrop shape compared to traditional D-to-round transitions, equal or better performance, no integral supports or additional material obstructing flow paths, approximately equivalent volute cross-sectional area (e.g., within 3%), approximately equivalent volute volume equivalent (e.g., within 3%), minimal area of surface roughness (e.g., less than 400, arched downskin), and a smoother volute to valve flowpath.

While certain figures may include embodiments of dimensions and relative dimensions, such dimensions and relative dimensions are not limiting. Any suitable dimensions or relative dimensions to allow additive manufacturing and/or for any suitable application are contemplated herein. Any suitable size or scale of the embodiments shown is contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An additively manufactured valve body, comprising:
   an interior surface defining a main channel along an axis in an axial direction, wherein the main channel has a non-uniform cross-section configured to allow the valve body to be additively manufactured without support structure, wherein the interior surface further defines one or more annular grooves extending radially outwardly from the main channel, wherein the one or more annular grooves include an asymmetric groove profile.

2. The valve body of claim 1, wherein the non-uniform cross-section has a teardrop shape.

3. The valve body of claim 2, wherein the interior surface includes a curved lower-in-build portion and a ramped higher-in-build portion that forms a V-shape extending from the curved lower-in-build portion.

4. The valve body of claim 3, wherein the curved lower-in-build portion has a semicircle cross-section.

5. The valve body of claim 4, wherein the ramped higher-in-build portion includes a curved peak.

6. The valve body of claim 5, wherein the valve body is additively manufactured such that the axis forms an angle of about 45 degrees or less with a build plate surface on which the valve body is built.

7. The valve body of claim 1, wherein a higher-in-build portion of the one or more annular grooves include curved shape in the axial direction, and wherein a lower-in-build portion of the one or more annular grooves includes a straight shape in the axial direction.

8. The valve body of claim 7, wherein the one or more annular grooves are two annular grooves positioned apart in an axial direction relative to each other.

9. An additively manufactured fluid pump case, comprising:
   a valve body for a fluid pump case having an interior surface defining a main channel along an axis in an axial direction, wherein the main channel has a non-uniform cross-section configured to allow the valve body to be additively manufactured without support structure, wherein the interior surface further defines one or more annular grooves extending radially outwardly from the main channel, wherein the one or more annular grooves include an asymmetric groove profile.

10. The fluid pump case of claim 9, wherein the non-uniform cross-section has a teardrop shape.

11. The fluid pump case of claim 10, wherein the interior surface includes a curved lower-in-build portion and a ramped higher-in-build portion that forms a V-shape extending from the curved lower-in-build portion.

12. The fluid pump case of claim 11, wherein the curved lower-in-build portion has a semicircle cross-section.

13. The fluid pump case of claim 12, wherein the ramped higher-in-build portion includes a curved peak.

14. The fluid pump case of claim 13, wherein the valve body is additively manufactured such that the axial axis forms an angle of about 45 degrees or less with a build plate surface on which the valve body is built.

15. The fluid pump case of claim 9, wherein a higher-in-build portion of the one or more annular grooves include curved shape in the axial direction, and wherein a lower-in-build portion of the one or more annular grooves includes a straight shape in the axial direction.

16. The fluid pump case of claim 15, wherein the one or more annular grooves are two annular grooves positioned apart in an axial direction relative to each other.

17. A method of manufacturing a fluid pump case, comprising:
additively manufacturing the valve body of claim 6; and
machining the main channel to have a different cross-section to allow the valve body to receive one or more valve components while leaving the one or more annular grooves.

18. A fluid pump case means for use as a fluid pump housing, the fluid pump case means having valve body means configured to allow additive manufacturing of the fluid pump case without building support structure in the valve body, wherein the valve body means includes an interior surface defining a main channel along an axis in an axial direction, wherein the main channel has a non-uniform cross-section configured to allow the valve body to be additively manufactured without support structure, wherein the interior surface further defines one or more annular grooves extending radially outwardly from the main channel, wherein the one or more annular grooves include an asymmetric groove profile.

* * * * *